(12) United States Patent
Fukuhara et al.

(10) Patent No.: US 8,634,665 B2
(45) Date of Patent: Jan. 21, 2014

(54) IMAGE PROCESSING APPARATUS AND IMAGE PROCESSING METHOD

(75) Inventors: Takahiro Fukuhara, Kanagawa (JP); Kazuhisa Hosaka, Tokyo (JP); Hiroshi Akinaga, Kanagawa (JP)

(73) Assignee: Sony Corporation, Tokyo (JP)

( * ) Notice: Subject to any disclaimer, the term of this patent is extended or adjusted under 35 U.S.C. 154(b) by 72 days.

(21) Appl. No.: 13/496,748

(22) PCT Filed: Sep. 14, 2010

(86) PCT No.: PCT/JP2010/065862
§ 371 (c)(1),
(2), (4) Date: May 16, 2012

(87) PCT Pub. No.: WO2011/037049
PCT Pub. Date: Mar. 31, 2011

(65) Prior Publication Data
US 2012/0230598 A1    Sep. 13, 2012

(30) Foreign Application Priority Data
Sep. 24, 2009    (JP) ................................. 2009-219627

(51) Int. Cl.
*G06K 9/46*    (2006.01)
(52) U.S. Cl.
USPC ........................................................ 382/233
(58) Field of Classification Search
None
See application file for complete search history.

(56) References Cited

U.S. PATENT DOCUMENTS

| | | | | |
|---|---|---|---|---|
| 6,560,369 | B1 * | 5/2003 | Sato | 382/239 |
| 6,813,314 | B2 * | 11/2004 | Aono et al. | 375/240.11 |
| 8,031,951 | B2 * | 10/2011 | Takada | 382/232 |
| 8,320,693 | B2 * | 11/2012 | Fukuhara et al. | 382/240 |
| 8,422,553 | B2 * | 4/2013 | Fukuhara et al. | 375/240.02 |
| 2005/0073892 | A1 | 4/2005 | Tanaka | |
| 2007/0165959 | A1 * | 7/2007 | Takada | 382/240 |
| 2008/0181300 | A1 * | 7/2008 | Hosaka et al. | 375/240.03 |
| 2008/0284788 | A1 * | 11/2008 | Ando et al. | 345/557 |
| 2008/0285870 | A1 * | 11/2008 | Ando et al. | 382/240 |

(Continued)

FOREIGN PATENT DOCUMENTS

| | | |
|---|---|---|
| JP | 2005 117156 | 4/2005 |
| JP | 2005 184086 | 7/2005 |
| JP | 2007 311924 | 11/2007 |

OTHER PUBLICATIONS

International Search Report issued on Dec. 28, 2010 in PCT/JP2010/065862 filed on Sep. 14, 2010.

*Primary Examiner* — Bhavesh Mehta
*Assistant Examiner* — Feng Niu
(74) *Attorney, Agent, or Firm* — Oblon, Spivak, McClelland, Maier & Neustadt, L.L.P.

(57) ABSTRACT

This invention relates to an image processing apparatus and an image processing method for improving the processing capacity per unit time in encoding and decoding images.
A coefficient line sorting portion 104 sorts coefficient lines into an order which is different from that of wavelet inverse transform process as well as from that of transmission and in which the coefficient lines are sorted for an encoding process of which the degree of difficulty of encoding can be estimated by a rate control portion 109 at the earliest possible time. An encoded line sorting portion 108 sorts encoded lines into an order which is different from that of wavelet inverse transform process and in which the encoded lines are transmitted with improved resistance to the instability of the available transmission rate. This invention can be applied to image processing apparatus, for example.

16 Claims, 24 Drawing Sheets

| 1HH, 1HL, 1LH (LINE L) |
|---|
| 1HH, 1HL, 1LH (LINE L+1) |
| 1HH, 1HL, 1LH (LINE L+2) |
| 1HH, 1HL, 1LH (LINE L+3) |
| 1HH, 1HL, 1LH (LINE L+4) |
| 1HH, 1HL, 1LH (LINE L+5) |
| 1HH, 1HL, 1LH (LINE L+6) |
| 1HH, 1HL, 1LH (LINE L+7) |
| 2HH, 2HL, 2LH (LINE M) |
| 2HH, 2HL, 2LH (LINE M+1) |
| 2HH, 2HL, 2LH (LINE M+2) |
| 2HH, 2HL, 2LH (LINE M+3) |
| 3HH, 3HL, 3LH (LINE N) |
| 3HH, 3HL, 3LH (LINE N+1) |
| 4HH, 4HL, 4LH, 4LL (LINE P) |

ENCODING ORDER (FROM HIGH-FREQUENCY TO LOW-FREQUENCY COMPONENTS)

| 4HH, 4HL, 4LH, 4LL (LINE P) |
|---|
| 3HH, 3HL, 3LH (LINE N) |
| 3HH, 3HL, 3LH (LINE N+1) |
| 2HH, 2HL, 2LH (LINE M) |
| 2HH, 2HL, 2LH (LINE M+1) |
| 2HH, 2HL, 2LH (LINE M+2) |
| 2HH, 2HL, 2LH (LINE M+3) |
| 1HH, 1HL, 1LH (LINE L) |
| 1HH, 1HL, 1LH (LINE L+1) |
| 1HH, 1HL, 1LH (LINE L+2) |
| 1HH, 1HL, 1LH (LINE L+3) |
| 1HH, 1HL, 1LH (LINE L+4) |
| 1HH, 1HL, 1LH (LINE L+5) |
| 1HH, 1HL, 1LH (LINE L+6) |
| 1HH, 1HL, 1LH (LINE L+7) |

TRANSMISSION ORDER (FROM LOW-FREQUENCY TO HIGH-FREQUENCY COMPONENTS)

(56) References Cited

U.S. PATENT DOCUMENTS

| | | | |
|---|---|---|---|
| 2008/0304574 A1* | 12/2008 | Fukuhara et al. | 375/240.29 |
| 2009/0201949 A1* | 8/2009 | Sunahara | 370/474 |
| 2009/0274378 A1* | 11/2009 | Fukuhara et al. | 382/232 |
| 2009/0316779 A1* | 12/2009 | Fukuhara et al. | 375/240.02 |
| 2010/0061643 A1* | 3/2010 | Fukuhara et al. | 382/232 |
| 2010/0166053 A1* | 7/2010 | Fukuhara et al. | 375/240.01 |

\* cited by examiner

F I G . 2
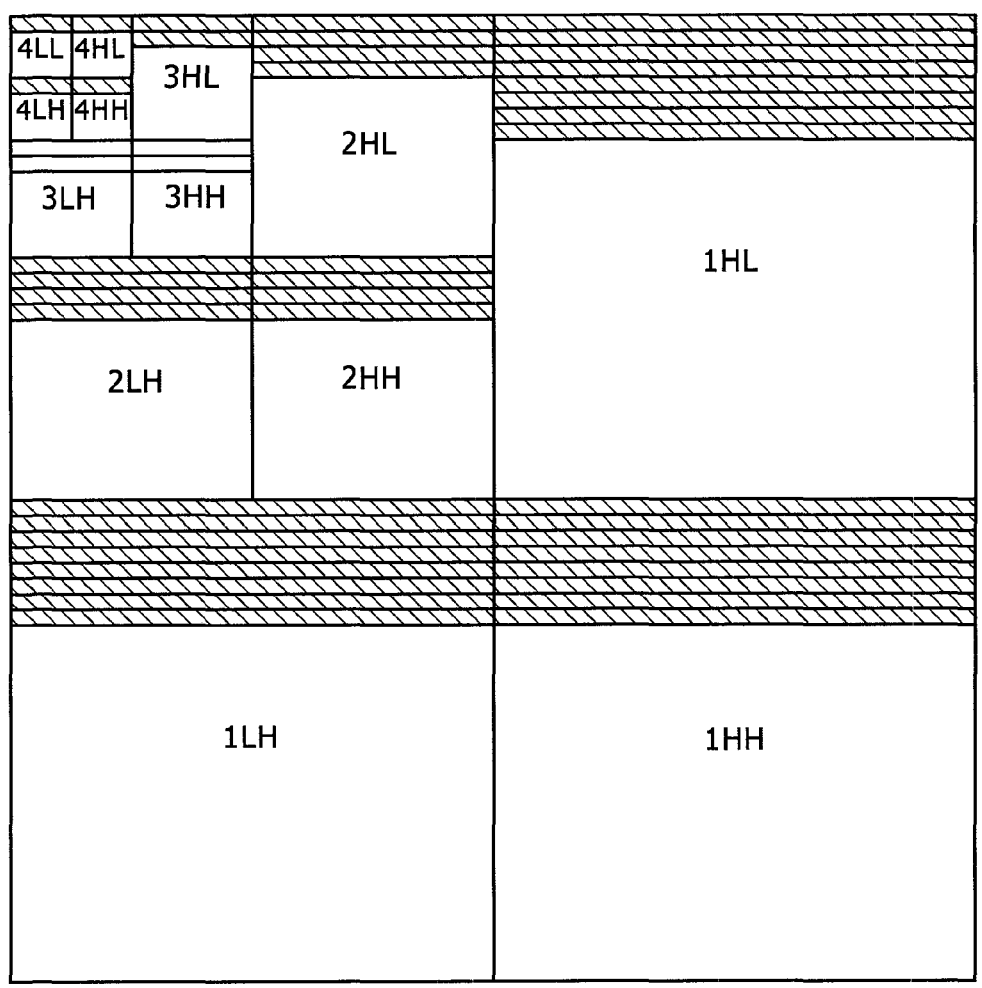

FIG. 9

| | |
|---|---|
| 1LL | 1HH, 1HL, 1LH (LINE 1) |
| 1LL | 1HH, 1HL, 1LH (LINE 2) |
| 1LL | 1HH, 1HL, 1LH (LINE 3) |
| 2LL | 2HH, 2HL, 2LH (LINE 1) |
| 1LL | 1HH, 1HL, 1LH (LINE 4) |
| 1LL | 1HH, 1HL, 1LH (LINE 5) |
| 2LL | 2HH, 2HL, 2LH (LINE 2) |
| 1LL | 1HH, 1HL, 1LH (LINE 6) |
| 1LL | 1HH, 1HL, 1LH (LINE 7) |
| 2LL | 2HH, 2HL, 2LH (LINE 3) |
| 3LL | 3HH, 3HL, 3LH (LINE 1) |
| 1LL | 1HH, 1HL, 1LH (LINE 8) |
| 1LL | 1HH, 1HL, 1LH (LINE 9) |
| 2LL | 2HH, 2HL, 2LH (LINE 4) |
| 1LL | 1HH, 1HL, 1LH (LINE 10) |
| 1LL | 1HH, 1HL, 1LH (LINE 11) |
| 2LL | 2HH, 2HL, 2LH (LINE 5) |
| 3LL | 3HH, 3HL, 3LH (LINE 2) |
| 1LL | 1HH, 1HL, 1LH (LINE 12) |
| 1LL | 1HH, 1HL, 1LH (LINE 13) |
| 2LL | 2HH, 2HL, 2LH (LINE 6) |
| 1LL | 1HH, 1HL, 1LH (LINE 14) |
| 1LL | 1HH, 1HL, 1LH (LINE 15) |
| 2LL | 2HH, 2HL, 2LH (LINE 7) |
| 3LL | 3HH, 3HL, 3LH (LINE 3) |
| | 4HH, 4HL, 4LH, 4LL (LINE 1) |

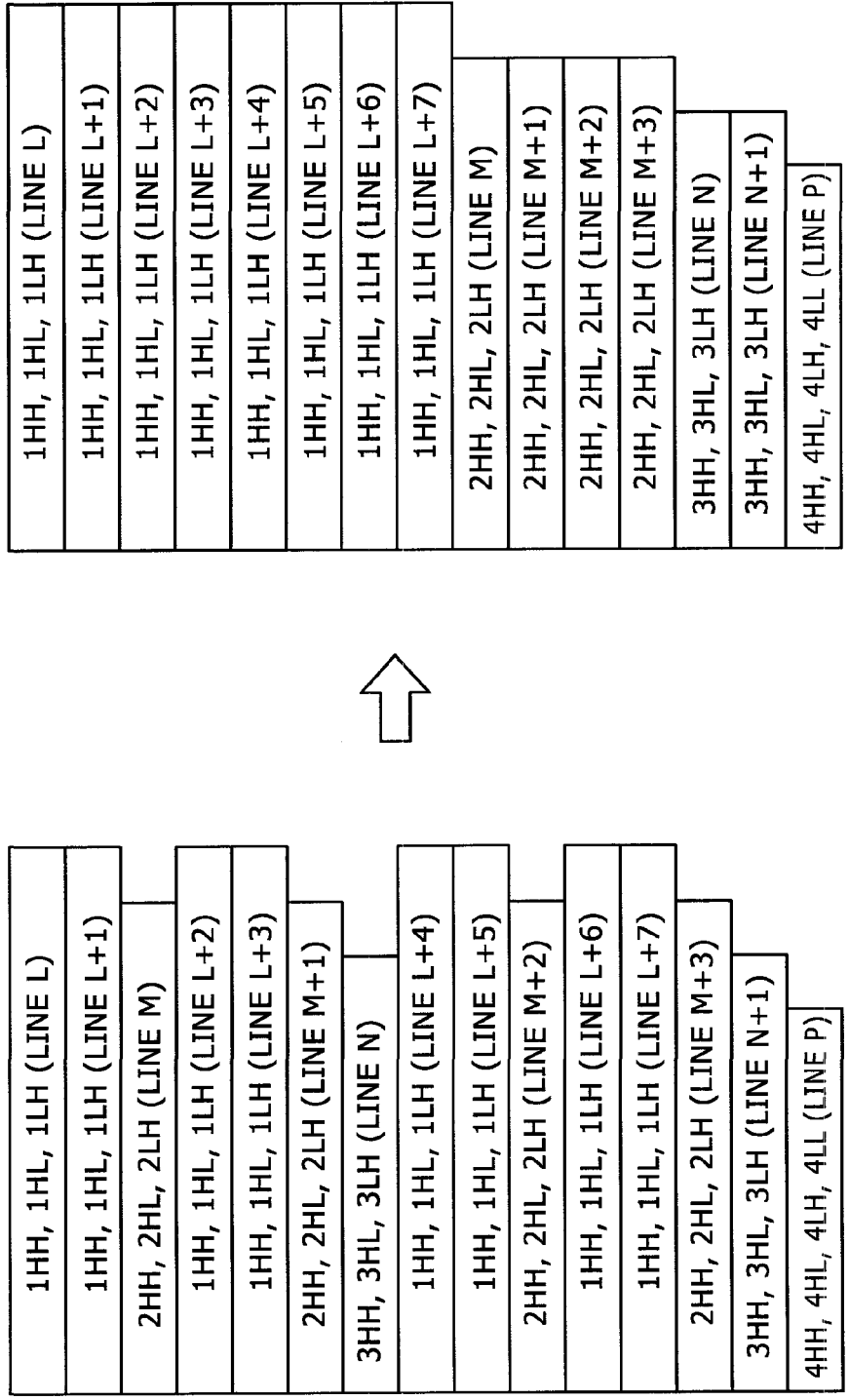

FIG.12

| HEADER INFORMATION | CODE WORD |
|---|---|
| Code_info(P) | 4HH, 4HL, 4LH, 4LL (LINE P) |
| Code_info(N) | 3HH, 3HL, 3LH (LINE N) |
| Code_info(M) | 2HH, 2HL, 2LH (LINE M) |
| Code_info(L) | 1HH, 1HL, 1LH (LINE L) |
| Code_info(L+1) | 1HH, 1HL, 1LH (LINE L+1) |
| Code_info(M+1) | 2HH, 2HL, 2LH (LINE M+1) |
| Code_info(L+2) | 1HH, 1HL, 1LH (LINE L+2) |
| Code_info(L+3) | 1HH, 1HL, 1LH (LINE L+3) |
| Code_info(N+1) | 3HH, 3HL, 3LH (LINE N+1) |
| Code_info(M+2) | 2HH, 2HL, 2LH (LINE M+2) |
| Code_info(L+4) | 1HH, 1HL, 1LH (LINE L+4) |
| Code_info(L+5) | 1HH, 1HL, 1LH (LINE L+5) |
| Code_info(M+3) | 2HH, 2HL, 2LH (LINE M+3) |
| Code_info(L+6) | 1HH, 1HL, 1LH (LINE L+6) |
| Code_info(L+7) | 1HH, 1HL, 1LH (LINE L+7) |

CODE AMOUNT (100 BYTES)

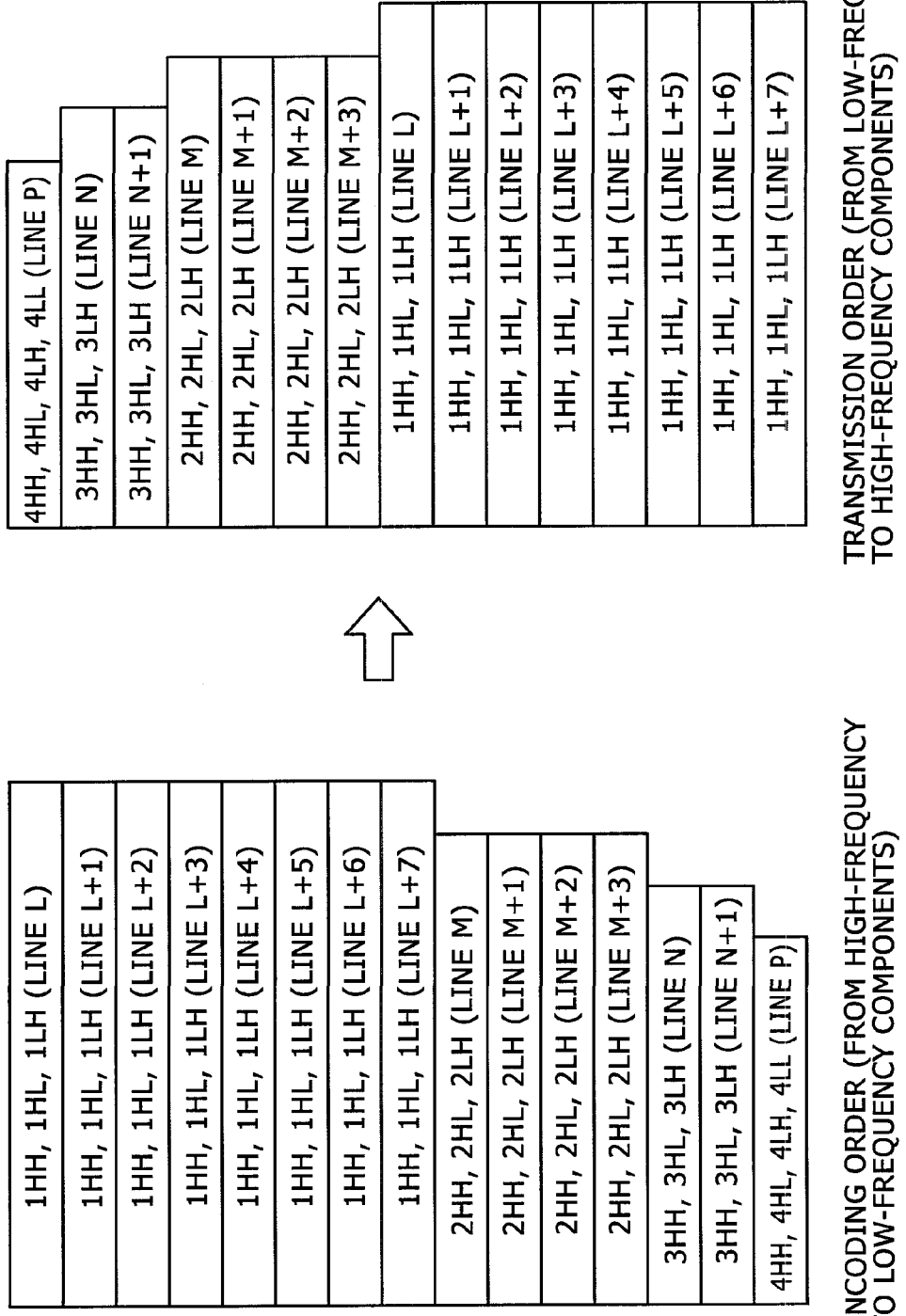

IMAGE PROCESSING APPARATUS AND IMAGE PROCESSING METHOD

TECHNICAL FIELD

The present invention relates to an image processing apparatus and an image processing method. More particularly, the invention relates to an image processing apparatus and an image processing method for boosting the processing capacity per unit time in encoding and decoding images.

BACKGROUND ART

The image compression methods that are prevalent today include JPEG (Joint Photographic Experts Group) and JPEG 2000 standardized by the ISO (International Standards Organization).

In recent years, studies have been underway on encoding methods that allow images to be split into a plurality of bands by a so-called filter bank combining a high-pass filter and a low-pass filter so that each band of the image may be coded individually. Of these encoding methods, wavelet transform coding is free from block distortion that can affect DCT (Discrete Cosine Transform) under high-compression conditions; the method is thus attracting attention as a new technique to replace DCT.

JPEG 2000, of which the international standardization was completed in January 2001, is a method that combines the above-mentioned wavelet transform with highly efficient entropy encoding (i.e., bit modeling and arithmetic encoding in units of a bit plane). As such, JPEG 2000 is a significant improvement over JPEG in terms of encoding efficiency.

JPEG 2000, selected also as the standard codec for the digital cinema standard (DCI (Digital Cinema Initiative) Standard), has started to be used in compressing the moving images of movies and the like. A number of manufacturers have started to introduce products that apply JPEG 2000 to such devices as surveillance cameras, on-site coverage cameras, and security recorders.

However, since JPEG 2000 involves encoding and encoding basically in units of a picture, attempts to achieve low delays in real-time transmission and reception entail a delay of at least one picture in encoding and decoding each.

The same applies not only to JPEG 2000 but also to such codecs as AVC (Advanced Video Coding) Intra and JPEG. Recently, means have been proposed for shortening delay time by dividing the screen into several rectangular slices or tiles and encoding and decoding each of them independently (e.g., see Patent Document 1).

PATENT DOCUMENT

Non-Patent Document

Non-Patent Document 1: Japanese Patent Laid-Open No. 2007-311924

SUMMARY OF INVENTION

Technical Problem

In recent years, however, the resolution of the images to be handled has become higher than ever, and so have been frame rates and gradations. This has led to ever-growing amounts of image data.

In order to encode and decode such images with less delay (i.e., virtually in real time), the need exists for further enhancement of throughput (i.e., processing capacity per unit time). To further improve throughput requires higher efficiency in such processes as encoding of images, transmission of encoded data, and decoding of the encoded data.

The present invention has been proposed in view of the above circumstances and aims at improving the processing capacity per unit time in encoding and decoding images.

Technical Solution

According to one aspect of the present invention, there is provided an image processing apparatus including: analysis filter means for performing analysis filter processing hierarchically so as to transform a line block including image data of as many lines as are needed to generate coefficient data of at least one line of the lowest frequency component subband, into coefficient data divided into different frequency bands; encoding means for encoding the coefficient data generated by the analysis filter means; and encoded data sorting means for sorting the encoded data obtained by the encoding means encoding the coefficient data, from the order in which the data is output from the analysis filter means performing the analysis filter processing, into a transmission order which is a predetermined order different from the order of the data being subjected to synthesis filter processing and in which the data is transmitted with improved resistance to the instability of transmission paths.

Preferably, the encoded data sorting means may sort the encoded data on different divided levels into the transmission order starting from a low-frequency component and going to a high-frequency component.

Preferably, the image processing apparatus may further include: coefficient data sorting means for sorting the coefficient data generated by the analysis filter means from the order in which the data is output from the analysis filter means performing the analysis filter processing, into an encoding order which is a predetermined order different from the order of the data being subjected to the synthesis filter processing as well as from the transmission order and which permits easier rate control of the encoded data; quantization means for quantizing the coefficient data sorted by the coefficient data sorting means; and rate control means for controlling the rate of the encoded data by controlling a quantization step size of quantization by the quantization means based on a result of encoding by the encoding means; wherein the encoding means may encode the coefficient data quantized by the quantization means.

Preferably, the coefficient data sorting means may sort the coefficient data on different divided levels into the transmission order starting from a low-frequency component and going to a high-frequency component.

Preferably, the analysis filter means may perform the analysis filter processing using lifting calculation.

Preferably, the analysis filter means may perform symmetric expansion of necessary pixels on the line block in an initial state before carrying out the lifting calculation on the line block, the analysis filter means further performing the lifting calculation on the line block in a steady state by use of a result of the preceding lifting calculation.

Preferably, the analysis filter means may perform the lifting calculation horizontally on the coefficient data before carrying out the lifting calculation vertically thereon.

According to another aspect of the present invention, there is provided an image processing method for use with an image processing apparatus, the image processing method including: causing analysis filter means of the image processing apparatus to perform analysis filter processing hierarchically so as to transform a line block including image data of as many lines as are needed to generate coefficient data of at least one line of the lowest frequency component subband, into coefficient data divided into different frequency bands; causing encoding means of the image processing apparatus to encode the coefficient data generated by the analysis filter processing; and causing an encoded data sorting means of the image processing apparatus to sort the encoded data obtained by encoding the coefficient data, from the order in which the data is output from the analysis filter processing, into a transmission order which is a predetermined order different from the order of the data being subjected to synthesis filter processing and in which the data is transmitted with improved resistance to the instability of transmission paths.

According to a further aspect of the present invention, there is provided an image processing apparatus including: decoding means for decoding encoded data generated by encoding a line block derived from the division of image data of a predetermined number of lines by hierarchical analysis filter processing into different frequency bands, the line block including at least one line of coefficient data of the lowest frequency component subband, the line block being further made up of a group of coefficient data of different subbands; coefficient data sorting means for sorting the coefficient data obtained through decoding by the decoding means from the order in which the data is decoded by the decoding means into an order in which the data is subjected to synthesis filter processing; and synthesis filter means for performing the synthesis filter processing hierarchically so as to transform into the image data the coefficient data of the different subbands sorted by the coefficient data sorting means.

Preferably, the synthesis filter means may perform the synthesis filter processing preferentially on the coefficient data of the subband on the lowest practicable level.

Preferably, the image processing apparatus may further include: interpretation means for interpreting the encoded data; and extraction means for extracting, based on a result of interpretation by the interpretation means, the encoded data through division thereof into encoded data corresponding to each line of the encoded data on each of different hierarchical levels; wherein the decoding means may decode the encoded data extracted by the extraction means.

Preferably, based on a result of interpretation by the interpretation means, the coefficient data sorting means may determine the order in which the coefficient data is sorted and change the determined sorting order to an order in which the coefficient data is subjected to synthesis filter processing.

Preferably, the synthesis filter means may perform the synthesis filter processing using lifting calculation.

Preferably, the synthesis filter means may perform symmetric expansion of necessary coefficient data on the line block in an initial state before carrying out the lifting calculation on the line block, the synthesis filter means further performing the lifting calculation on the line block in a steady state by use of a result of the preceding lifting calculation.

Preferably, the synthesis filter means may perform the lifting calculation horizontally on the coefficient data before carrying out the lifting calculation vertically thereon.

According to an even further aspect of the present invention, there is provided an image processing method for use with an image processing apparatus, the image processing method including: causing decoding means of the image processing apparatus to decode encoded data generated by encoding a line block derived from the division of image data of a predetermined number of lines by hierarchical analysis filter processing into different frequency bands, the line block including at least one line of coefficient data of the lowest frequency component subband, the line block being further made up of a group of coefficient data of different subbands; causing coefficient data sorting means of the image processing apparatus to sort the coefficient data obtained through decoding from the order in which the data is decoded into an order in which the data is subjected to synthesis filter processing; and causing synthesis filter means of the image processing apparatus to perform the synthesis filter processing hierarchically so as to transform into the image data the coefficient data of the different subbands having been sorted.

According to one aspect of the present invention outlined above, analysis filter processing is performed hierarchically so as to transform a line block including image data of as many lines as are needed to generate coefficient data of at least one line of the lowest frequency component subband, into coefficient data divided into different frequency bands; the coefficient data generated by analysis filter processing is encoded; and the encoded data obtained by encoding the coefficient data is sorted from the order in which the data is output from the analysis filter processing into a transmission order which is a predetermined order different from the order of the data being subjected to synthesis filter processing and in which the data is transmitted with improved resistance the instability of transmission paths.

According to another aspect of the present invention outlined above, decoding is performed on encoded data generated by encoding a line block derived from the division of image data of a predetermined number of lines by hierarchical analysis filter processing into different frequency bands, the line block including at least one line of coefficient data of the lowest frequency component subband, the line block being further made up of a group of coefficient data of different subbands; the coefficient data obtained through decoding is sorted from the order in which the coefficient data is decoded into an order in which the data is subjected to synthesis filter processing; and the synthesis filter processing is performed hierarchically so as to transform into the image data the coefficient data of the different subbands having been sorted.

Advantageous Effects

According to the present invention, it is possible to encode or decode images. In particular, the invention makes it possible to improve the processing capacity per unit time in encoding and decoding images.

BRIEF DESCRIPTION OF DRAWINGS

FIG. 2 is a schematic view explanatory of subbands and line blocks.

FIG. 9 is a schematic view explanatory of a typical order in which coefficient data is output.

FIG. 11 is a schematic view explanatory of how coefficient data before encoding is sorted.

FIG. 12 is a schematic view explanatory of an example in which header information is added.

FIG. 13 is a schematic view explanatory of how coefficient data after encoding is sorted.

MODE FOR CARRYING OUT THE INVENTION

Described below are some embodiments in which the present invention may be practiced (called the embodiment or embodiments hereunder). The description will be given under the following headings:

1. First embodiment (image encoding apparatus);
2. Second embodiment (image decoding apparatus);
3. Third embodiment (transmission system); and
4. Fourth embodiment (personal computer).

1. First Embodiment

[Device Structure]

Figure 1:
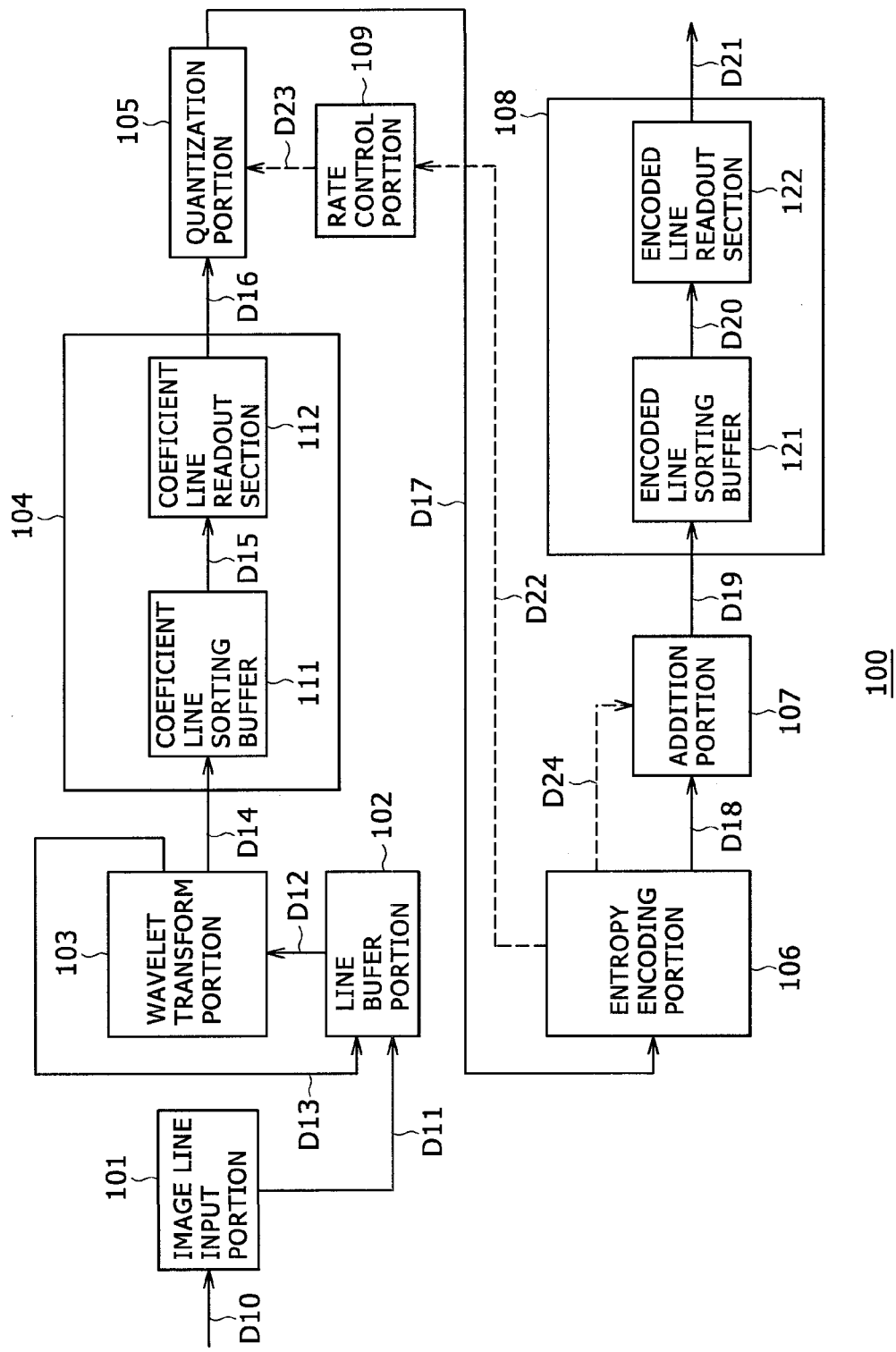
FIG. 1 is a block diagram showing a typical major structure of an image encoding apparatus to which the present invention is applied.

FIG. 1 shows a structure of an image encoding apparatus acting as an image processing apparatus to which the present invention is applied.

In FIG. 1, an image encoding apparatus 100 is an apparatus that encodes image data. The image encoding apparatus 100 includes an image line input portion 101, a line buffer portion 102, a wavelet transform portion 103, a coefficient line sorting portion 104, a quantization portion 105, an entropy encoding portion 106, an addition portion 107, and an encoded line sorting portion 108. The image encoding apparatus 100 further includes a rate control portion 109.

The image line input portion 101 supplies (arrow D11) input image data (arrow D10) line by line to the line buffer portion 102 so as to have the data accumulated in the line buffer portion 102. The line buffer portion 102 holds the image data fed from the image line input portion 101 and the coefficient data supplied from the wavelet transform portion 103, and sends the image data and coefficient data to the wavelet transform portion 103 at appropriate timings (arrow D12).

The wavelet transform portion 103 performs wavelet transform on the image data and coefficient data supplied from the line buffer portion 102 so as to generate coefficient data of the high-frequency and low-frequency components on the next hierarchical level. Wavelet transform will be discussed later in detail.

The wavelet transform portion 103 supplies the line buffer portion 102 with the low-frequency component in the vertical and the horizontal directions of the generated coefficient data to let the line buffer portion 102 hold the supplied component (arrow D13), and feeds the other components to the coefficient line sorting portion 104 (arrow D14). If the generated coefficient data is on the highest hierarchical level, the wavelet transform portion 103 supplies the component in the vertical and the horizontal directions also to the coefficient line sorting portion 104.

The coefficient line sorting portion 104 is supplied with coefficient data (coefficient lines) from the wavelet transform portion 103 (arrow D14). The coefficient line sorting portion 104 sorts the coefficient data (coefficient lines) into a predetermined order for an encoding process which is different from the order of wavelet inverse transform process as well as from the order of transmission.

As shown in FIG. 1, the coefficient line sorting portion 104 includes a coefficient line sorting buffer 111 and a coefficient line readout section 112. The coefficient line sorting buffer 111 holds the coefficient lines fed from the wavelet transform portion 103. The coefficient line readout section 112 sorts the coefficient lines, which is hold by the coefficient line sorting buffer 111, by reading them out of the coefficient line sorting buffer 111 (arrow D15) into the order for the encoding process. This sorting process will be discussed later in detail.

The coefficient line sorting portion 104 (coefficient line readout section 112) supplies the sorted coefficient data to the quantization portion 105 (arrow D16).

The quantization portion 105 quantizes the coefficient data supplied from the coefficient line sorting portion 104. Any appropriate technique may be adopted as the method for this quantization. For example, common means such as the technique defined by the expression (1) below may be utilized whereby coefficient data W is divided by a quantization step size Q.

$$\text{Quantization coefficient} = W/Q \qquad (1)$$

The quantization step size Q above is designated by the rate control portion 109. The quantization portion 105 supplies the quantized coefficient data to the entropy encoding portion 106 (arrow D17).

The entropy encoding portion 106 encodes the coefficient data coming from the quantization portion 105 using an appropriate entropy encoding technique such as Huffman encoding or arithmetic encoding. After encoding one coefficient line, the entropy encoding portion 106 supplies the addition portion 107 with one encoded line composed of the encoded data generated from that one coefficient line (arrow D18). The entropy encoding portion 106 further supplies the code amount of the one encoded line to the addition portion 107 (broken line arrow D24).

The addition portion 107 adds to the one encoded line fed from the entropy encoding portion 106 the code amount of the supplied one encoded line from the entropy encoding portion 106 as header information. Addition of header information will be discussed later in detail. After adding the header information, the addition portion 107 supplies the encoded data (encoded line) in question to the encoded line sorting portion 108 (arrow D19)

The encoded line sorting portion 108 sorts the encoded line into a predetermined order for transmission different from the order of wavelet inverse transform process.

As shown in FIG. 1, the encoded line sorting portion 108 includes an encoded line sorting buffer 121 and an encoded line readout section 122. The encoded line sorting buffer 121 holds the encoded line (including header information) fed from the addition portion 107. The encoded line readout section 122 sorts encoded lines, which is hold by the encoded line sorting buffer 121, by reading them out of the encoded line sorting buffer 121 (arrow D20) into the order for transmission. This sorting process will be discussed later in detail.

The encoded line sorting portion 108 (encoded line readout section 122) outputs the sorted encoded data to the outside of the image encoding apparatus 100 (arrow D21). The encoded data output from the image encoding apparatus 100 is supplied to an image decoding apparatus, to be discussed later, via a network or the like for example.

The encoded data has been sorted by the encoded line sorting portion 108 in the order fit for transmission. This makes it possible to enhance resistance to the instability of the available transmission rate, for example.

The entropy encoding portion 106 also supplies the code amount of each encoded line to the rate control portion 109 (broken line arrow D22).

Based on the code amount of each encoded line coming from the entropy encoding portion 106, the rate control portion 109 estimates the degree of difficulty in encoding the image. In accordance with the estimated degree of difficulty in encoding, the rate control portion 109 designates the quantization step size Q (broken line arrow D23) to be used by the quantization portion 105. That is, the rate control portion 109 performs rate control on the encoded data by designating the quantization step size Q.

The coefficient lines are sorted by the coefficient line sorting portion 104 into an order that allows the rate control portion 109 to be capable of estimating the degree of difficulty in coding earlier. That is, the coefficient lines are sorted into an order such that the larger the image feature quantity contained in the coefficient line, the sooner the line is encoded by the entropy encoding portion 106.

In this manner, the larger the image feature quantity, the sooner the code amount reflecting the feature quantity is supplied to the rate control portion 109. This allows the rate control portion 109 to set the quantization step size Q earlier in keeping with the degree of difficulty in image encoding (i.e., to perform appropriate rate control earlier).

[Explanation of Subbands]

Wavelet transform is now explained. Wavelet transform is a process that recursively repeats analysis filtering for dividing image data into a high spatial frequency component (high-frequency component) and a low spatial frequency component (low-frequency component), thereby transforming the image data into coefficient data of hierarchically structured frequency components. In the ensuing description, the divided level will be considered to be low the higher the frequency component of the hierarchical level, and to be high the lower the frequency component of the hierarchical level.

On one hierarchical level (divided level), analysis filtering is performed in both the horizontal and the vertical directions. Analysis filtering is carried out first in the horizontal direction, followed by analysis filtering in the vertical direction. Thus the coefficient data (image data) on one hierarchical level is divided into four subbands (LL, LH, HL, and HH) through analysis filtering for one hierarchical level. Analysis filtering on the next hierarchical level is performed on that one of the four generated subbands which has low components (LL) in both the horizontal and the vertical directions.

Recursively repeating analysis filtering in that manner makes it possible to confine the coefficient data of low spatial frequency bands into progressively smaller regions. The coefficient data having undergone wavelet transform as described above can thus be encoded efficiently.

FIG. 2 is a schematic view explanatory of a structure of the coefficient data generated by repeating analysis filtering four times.

When analysis filtering on divided level 1 is performed on baseband image data, the image data is transformed into four subbands on divided level 1 (1LL, 1LH, 1HL, and 1HH). Analysis filtering on divided level 2 is then performed on the low-frequency component subband 1LL on divided level 1 in both the horizontal and the vertical directions. This transforms the subband 1LL into four subbands on divided level 2 (2LL, 2LH, 2HL, and 2HH). Analysis filtering on level 3 is performed on the low-frequency component subband 2LL on divided level 2 both horizontally and vertically. This transforms the subband 2LL into four subbands on divided level 3 (3LL, 3LH, 3HL, and 3HH). Analysis filtering on level 4 is performed on the low-frequency component subband 3LL on divided level 3 both horizontally and vertically. This transforms the subband 3LL into four subbands on divided level 4 (4LL, 4LH, 4HL, and 4HH).

FIG. 2 shows a structure of the coefficient data divided as explained above into 13 subbands.

The above-described analysis filtering turns process target two-line image data or coefficient data, line by line, into the coefficient data of four subbands on one hierarchical level higher. Thus as shown by shaded parts in FIG. 2, generating each line of subband coefficient data on divided level 4 requires two lines of the subband 3LL, four lines of the subband 2LL, and eight lines of the subband 1LL. That is, 16 lines of image data are needed.

The image data of as many lines as are needed to generate one line of subband coefficient data of the lowest frequency component is called a line block (or a precinct). A line block also refers to a set of coefficient data of each of the subbands obtained by performing wavelet transform on the image data of the line block in question.

For example, in the case of FIG. 2, the image data of 16 lines, not shown, forms one line block. The line block may also refer to eight-line coefficient data of each of the subbands on divided level 1, four-line coefficient data of each of the subbands on divided level 2, two-line coefficient data of each of the subbands on divided level 3, and one-line coefficient data of each of the subbands on divided level 4, all generated from the 16-line image data.

The wavelet transform portion 103 may be said to perform wavelet transform on each of such line blocks.

A line in this context refers to one line formed within a picture or a field corresponding to image data before wavelet transform, within each divided level, or within each subband.

One line of coefficient data (image data) may also be called a coefficient line. If it is necessary to make more detailed distinctions for explanation purposes, the wording may be modified as needed. For example, one line of a subband may be called "a coefficient line of a subband, and one line of all subbands (LH, HL, and HH (including LL in the case of the highest hierarchical level)) on a hierarchical level (divided level) generated from the same two coefficient lines of one hierarchical level lower may be called "a coefficient line on a divided level (or hierarchical level)."

In the example of FIG. 2, "the coefficient line on divided level 4 (the highest hierarchical level)" refers to one corresponding line of the subbands 4LL, 4LH, 4HL, and 4HH (generated from the same coefficient line on one divided level lower). And "the coefficient line on divided level 3" refers to one corresponding line of the subbands 3LH, 3HL, and 3HH. Furthermore, "the coefficient line of the subband 2HH" refers to one line of the subband 2HH.

Also, one line of encoded data obtained by encoding one coefficient line (one line of coefficient data) may be called an encoded line.

Wavelet transform on divided level 4 was explained above in reference to FIG. 2. The ensuing description will show that wavelet transform is performed up to divided level 4. In practice, however, the number of hierarchical levels (divided levels) for wavelet transform may be determined as desired.

[Lifting Calculation]

The wavelet transform portion 103 usually performs the above-described process using a filter bank made up of a low-pass filter and a high-pass filter. Generally, digital filters each have an impulse response that is a plurality of tap length, i.e., filter coefficient. It follows that these filters require having a sufficient amount of input image data or coefficient data buffered beforehand for carrying out filtering. Likewise, when wavelet transform is performed on multiple levels, it is necessary to buffer a sufficient number of wavelet transform coefficients generated on the preceding level for carrying out filtering.

A technique involving the use of a 5×3 filter is explained below as a specific example of wavelet transform. The method of using the 5×3 filter has also been adopted by the JPEG (Joint Photographic Experts Group) 2000 standard explained above in connection with the background art. This is an excellent method permitting wavelet transform with a minimum of filter taps.

As defined by the expressions (2) and (3) below, the impulse response (Z transform expression) of the 5×3 filter is formed by a low-pass filter $H_0(z)$ and a high-pass filter $H_1(z)$. The expressions (2) and (3) show that the low-pass filter $H_0(z)$ has five taps and the high-pass filter $H_1(z)$ has three taps.

$$H_0(z)=(-1+2z^{-1}+6z^{-2}+2z^{-3}-z^{-4})/8 \quad (2)$$

$$H_1(z)=(-1+2z^{-1}-z^{-2})/2 \quad (3)$$

The expressions (2) and (3) above allow the coefficients of the low-frequency and high-frequency components to be calculated directly. Resorting to the lifting technique can reduce the amount of filtering calculations.

Figure 3:
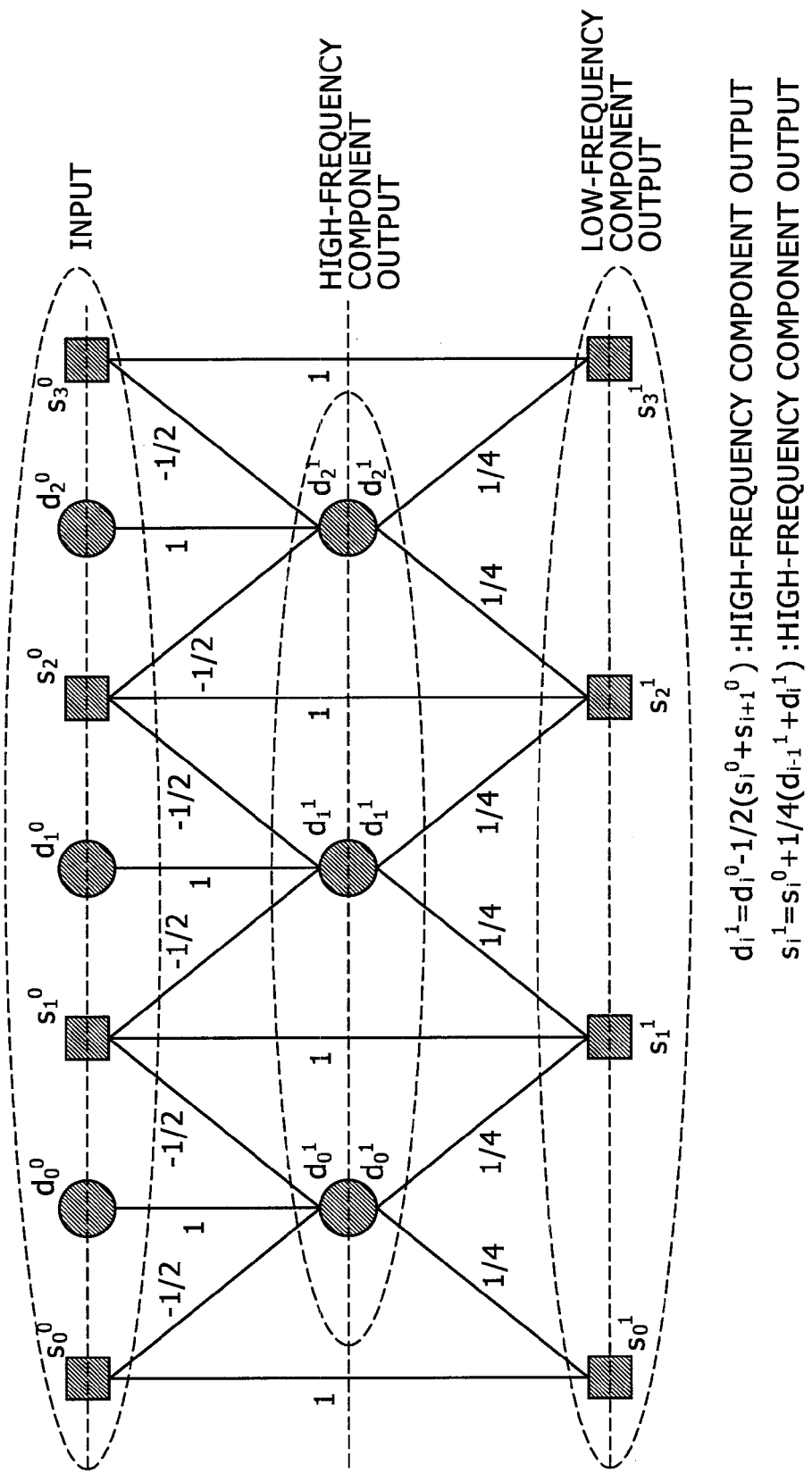
FIG. 3 is a schematic view showing a typical 5×3 filter.

FIG. 3 shows a lifting representation of the 5×3 filter. In FIG. 3, one row in the uppermost part represents an input signal sequence. Data processing proceeds from the top down on the screen. The expressions (4) and (5) below are used to output the coefficient of the high-frequency component (high-frequency coefficient) and the coefficient of the low-frequency component (low-frequency coefficient)

$$d_i^1=d_i^0-\frac{1}{2}(s_i^0+s_{i+1}^0) \quad (4)$$

$$s_i^1=s_i^0+\frac{1}{4}(d_{i-1}^1+d_i^1) \quad (5)$$

Figure 4:
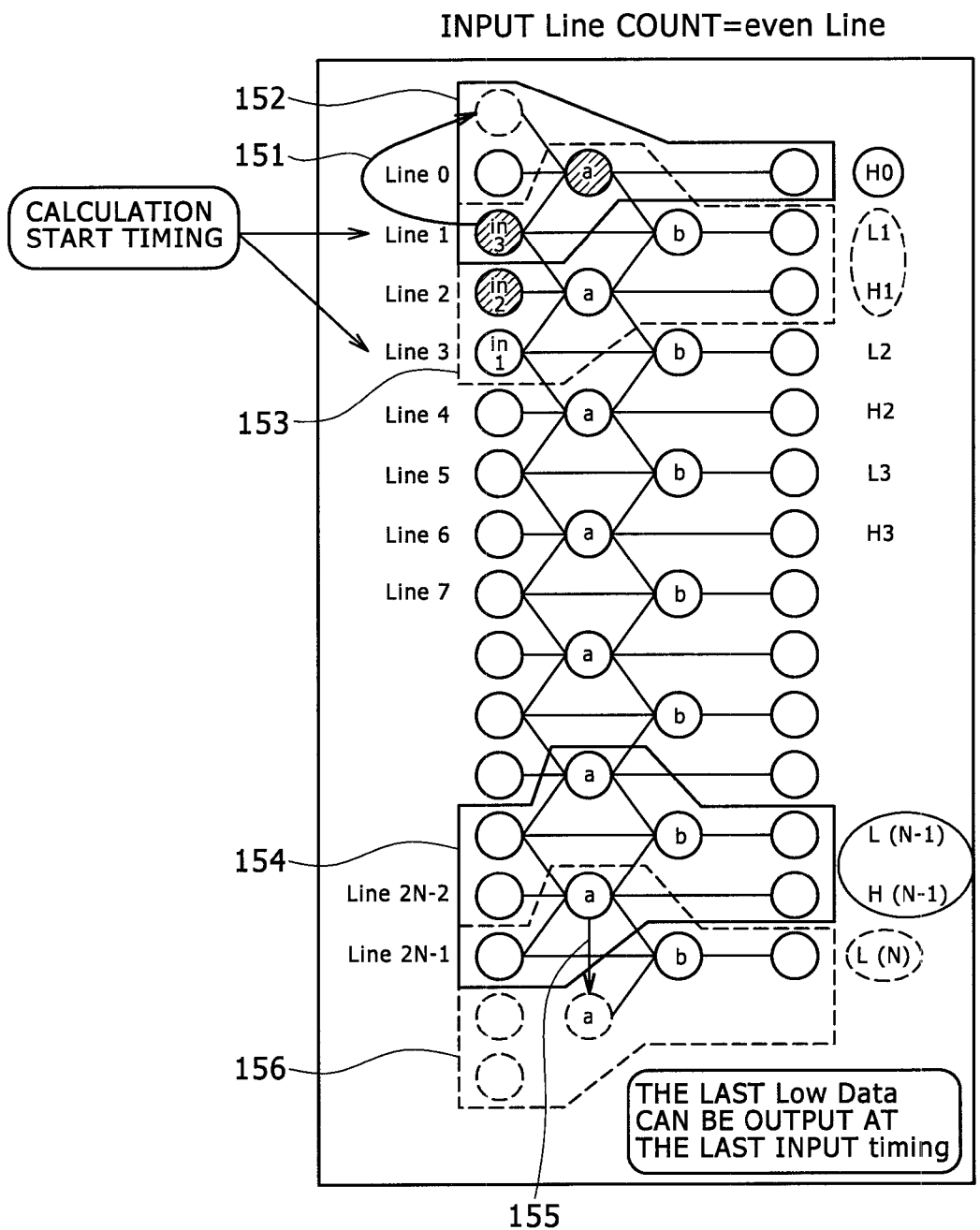
FIG. 4 is a schematic view explanatory of an example of lifting calculation.

FIG. 4 shows how filtering is performed on lines in the lengthwise direction using a 5×3 analysis filter. The crosswise direction denotes the process of calculation and the low-frequency and high-frequency coefficients generated thereby. Compared with what is indicated in FIG. 3, FIG. 4 simply shows that the horizontal direction is switched to the vertical direction while the calculation technique remains identical.

At the top part of the image (indicated by an arrow 151), the uppermost line is symmetrically expanded starting from Line-1 (indicated by broken lines) whereby one line is added. As indicated by a frame 152, the added line, Line-0, and Line-1 are used to perform lifting calculation, so that a coefficient a is generated through Step-1 calculation. This is a high-frequency coefficient (H0).

When Line-1, Line-2, and Line-3 are input, these three lines are used to calculate the next high-frequency coefficient a. This is a high-frequency coefficient (H1). Then the first high-frequency coefficient a (H0), the second high-frequency coefficient a (H1), and the coefficient of Line-1 are used to perform calculation in accordance with the expression 2, whereby a coefficient b is generated. This is a low-frequency coefficient (L1). That is, as indicated by a frame 153, Line-1, Line-2, Line-3, and the high-frequency coefficient (H0) are used to generate the low-frequency coefficient (L1) and high-frequency coefficient (H1).

Thereafter, every time two lines are input, the above-described lifting calculation is repeated on the subsequent lines and the low-frequency and high-frequency coefficients are output. When a low-frequency coefficient (L(N−1)) and a high-frequency coefficient (H(N−1)) are generated as indicated by a frame 154, the high-frequency coefficient (H(N−1)) is symmetrically expanded as pointed to by an arrow 155. Calculation is performed as indicated by a frame 156 to generate a low-frequency component (L(N)).

The above-described lifting calculation is performed recursively on each hierarchical level.

Whereas FIG. 4 gives an example in which filtering is performed on lines in the vertical direction, it is evident that the same applies to filtering in the horizontal direction.

[Steps of Analysis Filtering]

The above-described analysis filtering is carried out as shown in FIGS. 5 through 8.

Figure 5:
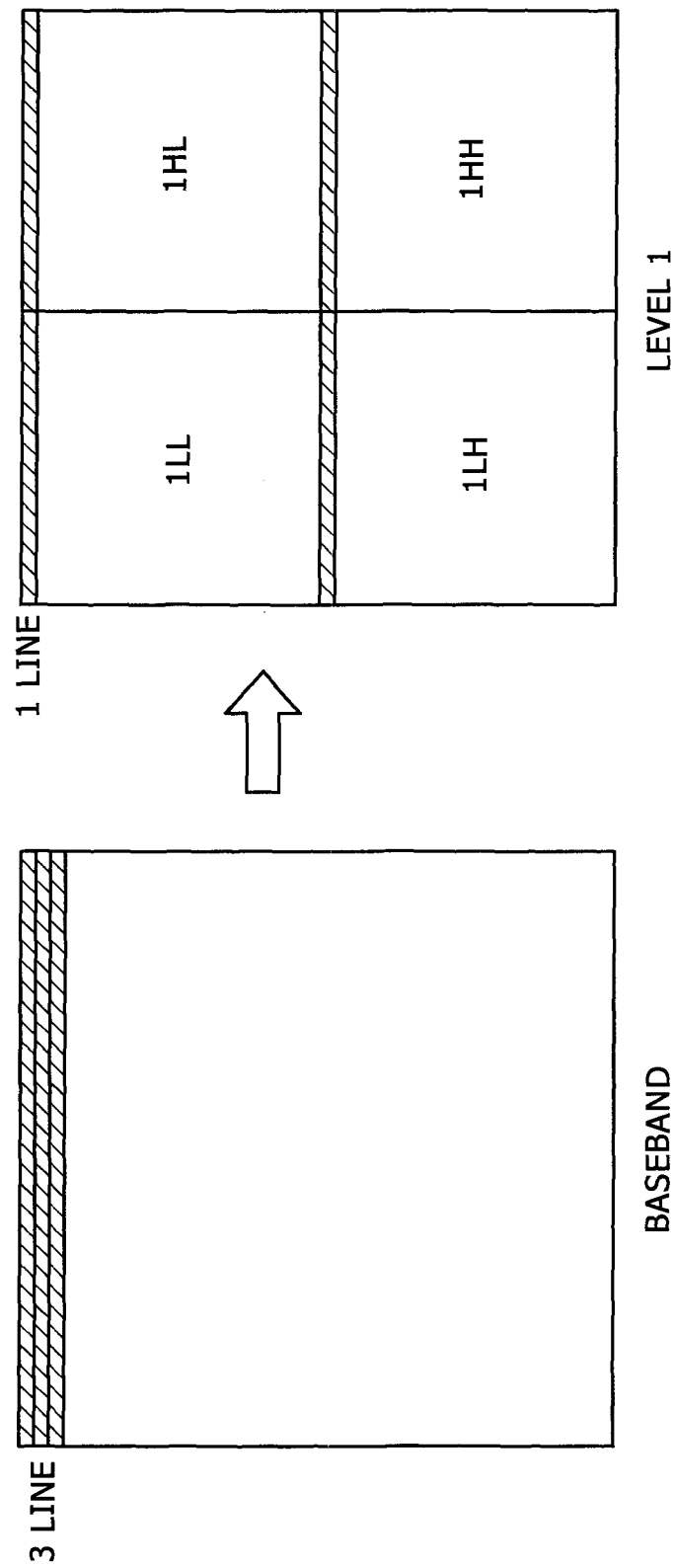
FIG. 5 is a schematic view explanatory of how an analysis filtering process is performed.
Figure 6:
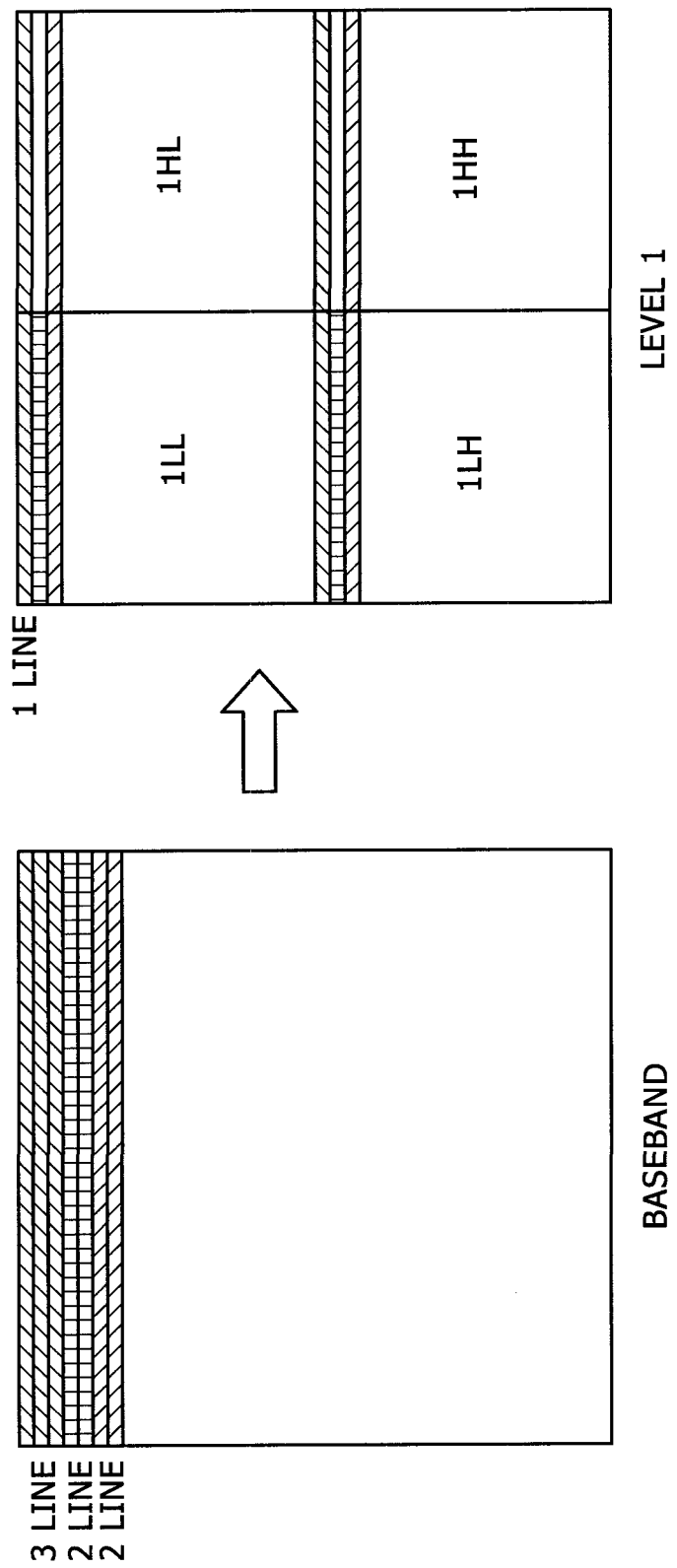
FIG. 6 is another schematic view explanatory of how the analysis filtering process is performed.

That is, when three lines of baseband image data are input as shown on the left side of FIG. 5, lifting calculation is performed as explained above in reference to FIG. 4. This generates one line of each of the subbands (1LL, 1LH, 1HL, 1HH) on divided level 1, as shown on the right side of FIG. 5.

Thereafter, every time two lines of baseband image data are input, lifting calculation is performed likewise. Thus from seven lines of baseband image data shown on the left side of FIG. 6, three coefficient lines of each of the subbands on divided level 1 are generated as indicated on the right side of FIG. 6.

Figure 7:
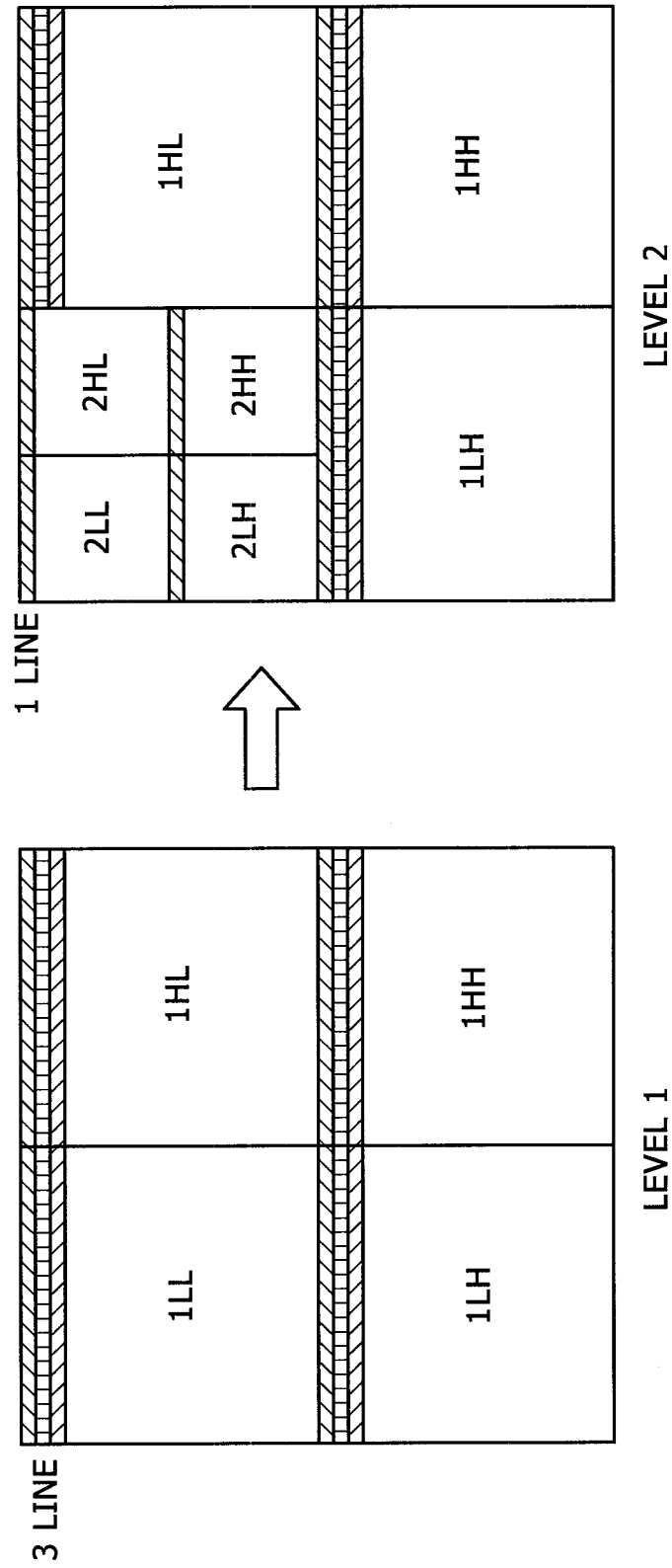
FIG. 7 is another schematic view explanatory of how the analysis filtering process is performed.

When three coefficient lines of the subband 1LL are generated as shown on the left side of FIG. 7 (on the right side of FIG. 6), lifting calculation is performed as explained above in reference to FIG. 4. This generates one line of each of the subbands on divided level 2 (2LL, 2LH, 2HL, 2HH) on the right side of FIG. 7. On divided level 1, as on the baseband, lifting calculation is performed thereafter every time two coefficient lines of the subband 1LL are generated, so that one coefficient line of each of the subbands on divided level 2 is generated.

Figure 8:
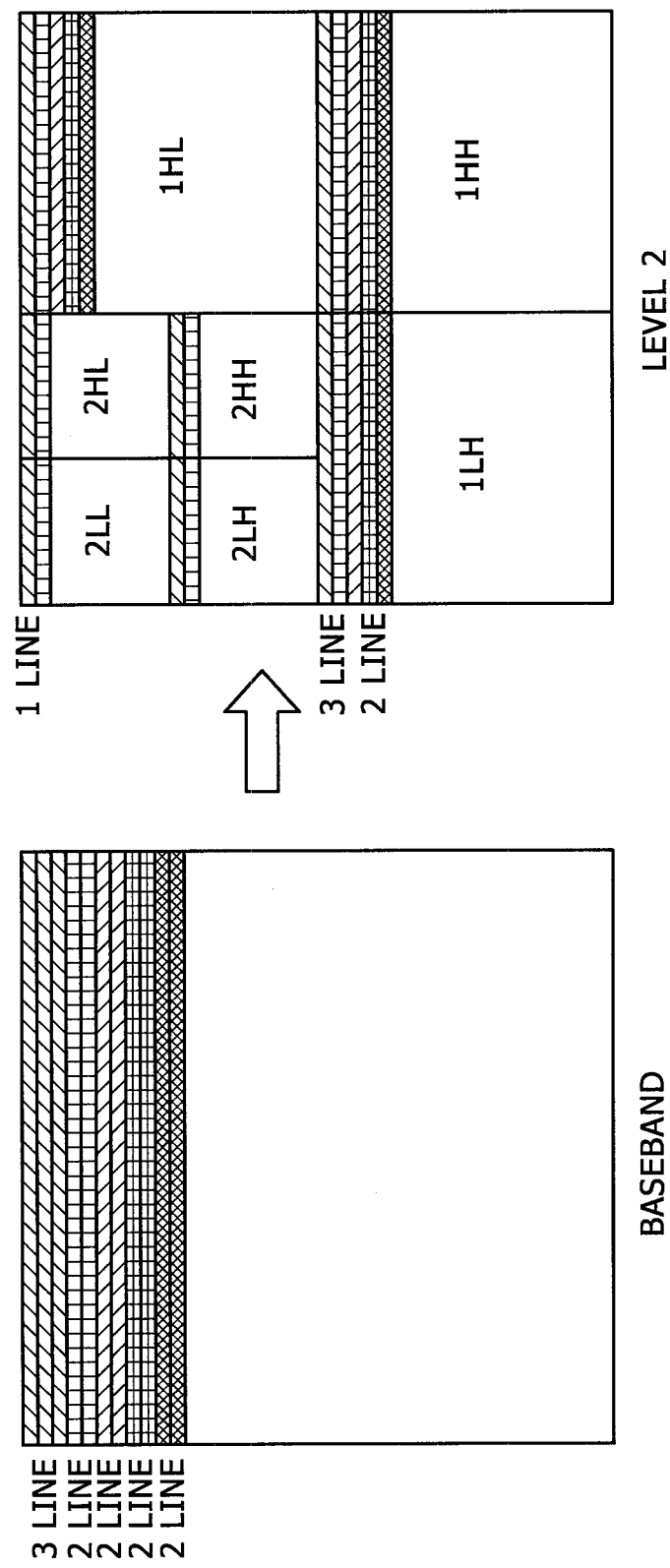
FIG. 8 is another schematic view explanatory of how the analysis filtering process is performed.

Consequently, from 11 lines of baseband image data shown on the left side of FIG. 8, the calculation generates two coefficient lines of each of the subbands on divided level 2 and five coefficient lines of each of the subbands 1LH, 1HL, and 1HH on divided level 1 as shown on the right side of FIG. 8.

That is, lifting calculation is performed on the highest practicable hierarchical level at the moment. In other words, lifting calculation is carried out preferentially on the highest possible hierarchical level. In the initial state at the top part of the image, analysis filtering requires the input of three lines of image data or coefficient data. In the steady state of the remaining parts, however, analysis filtering is performed every time two lines of image data or coefficient data are input.

Lifting calculation is performed in the above-described steps.

[Output of the Wavelet Transform Portion 103]

Explained below is the data output from the wavelet transform portion 103 carrying out analysis filtering in the steps discussed above. FIG. 9 shows data output chronologically from the wavelet transform portion 103 in an initial state. In FIG. 9, the data output from the wavelet transform portion 103 is arrayed chronologically from the top down.

When the wavelet transform portion 103 performs analysis filtering in the above-described steps, the first coefficient line (line 1) from the top on divided level 1 (subbands 1HH, 1HL, and 1LH) is output from the wavelet transform portion 103 and supplied to the coefficient line sorting portion 104. The line 1 of the subband 1LL is supplied to and held by the line buffer portion 102.

Then as soon as the line 2 (second coefficient line from the top) and line 3 (third coefficient line from the top) on divided level 1 are generated, they are supplied consecutively to the coefficient line sorting portion 104. The line 2 and line 3 of the subband 1LL are supplied to and held by the line buffer portion 102.

As described above, when the line buffer portion 102 holds three coefficient lines of the subband 1LL (two lines from the second time on), the wavelet transform portion 103 performs analysis filtering on divided level 1 with regard to these lines.

Consequently, after the line 3 on divided level 1 is output, the line 1 on divided level 2 (subbands 2HH, 2HL, and 2LH) is output and supplied to the coefficient line sorting portion 104. Also, the line 1 of the subband 2LL is supplied to and held by the line buffer portion 102.

Then line 4 (fourth coefficient line from the top) and line 5 (fifth coefficient line from the top) on divided level 1 are generated, in that order, and supplied consecutively to the coefficient line sorting portion 104. The line 4 and line 5 of the subband 1LL are supplied to and held by the line buffer portion 102.

After two coefficient lines of the subband 1LL are held by the line buffer portion 102, analysis filtering on divided level 1 is performed on these lines. The wavelet transform portion 103 outputs the line 2 on divided level 2 and supplies the line to the coefficient line sorting portion 104. Also, the line 2 of the subband 2LL is supplied to and held by the line buffer portion 102.

Then line 6 (sixth coefficient line from the top) and line 7 (seventh coefficient line from the top) on divided level 1 are generated, in that order, and supplied consecutively to the coefficient line sorting portion 104. The line 6 and line 7 of the subband 1LL are supplied to and held by the line buffer portion 102.

After two coefficient lines of the subband 1LL are held by the line buffer portion 102, analysis filtering on divided level 1 is performed on these lines. The wavelet transform portion 103 outputs the line 3 on divided level 2 and supplies the line to the coefficient line sorting portion 104. Also, the line 3 of the subband 2LL is supplied to and held by the line buffer portion 102.

When three coefficient lines of the subband 2LL (two lines from the second time on) are held by the line buffer portion 102, analysis filtering on divided level 2 is performed on these lines. The wavelet transform portion 103 outputs the line 1 on divided level 3 (subbands 3HH, 3HL, and 3LH) and supplies the line to the coefficient line sorting portion 104. Also, the line 1 of the subband 3LL is supplied to and held by the line buffer portion 102.

Then line 8 (eighth coefficient line from the top) and line 9 (ninth coefficient line from the top) on divided level 1 are generated, in that order, and supplied consecutively to the coefficient line sorting portion 104. The line 8 and line 9 of the subband 1LL are supplied to and held by the line buffer portion 102.

When two coefficient lines of the subband 1LL are held by the line buffer portion 102, analysis filtering on divided level 1 is performed on these lines. The wavelet transform portion 103 outputs the line 4 on divided level 2 and supplies the line to the coefficient line sorting portion 104. Also, the line 4 of the subband 2LL is supplied to and held by the line buffer portion 102.

Then line 10 (tenth coefficient line from the top) and line 11 (eleventh coefficient line from the top) on divided level 1 are generated, in that order, and supplied consecutively to the coefficient line sorting portion 104. The line 10 and line 11 of the subband 1LL are supplied to and held by the line buffer portion 102.

When two coefficient lines of the subband 1LL are held by the line buffer portion 102, analysis filtering on divided level 1 is performed on these lines. The wavelet transform portion 103 outputs the line 5 on divided level 2 and supplies the line to the coefficient line sorting portion 104. Also, the line 5 of the subband 2LL is supplied to and held by the line buffer portion 102.

When two coefficient lines of the subband 2LL are held by the line buffer portion 102, analysis filtering on divided level 2 is performed on these lines. The wavelet transform portion 103 outputs the line 2 on divided level 3 and supplies the line to the coefficient line sorting portion 104. Also, the line 2 of the subband 3LL is supplied to and held by the line buffer portion 102.

Then line 12 (twelfth coefficient line from the top) and line 13 (thirteenth coefficient line from the top) on divided level 1 are generated, in that order, and supplied consecutively to the coefficient line sorting portion 104. The line 12 and line 13 of the subband 1LL are supplied to and held by the line buffer portion 102.

When two coefficient lines of the subband 1LL are held by the line buffer portion 102, analysis filtering on divided level 2 is performed on these lines. The wavelet transform portion 103 outputs the line 6 on divided level 2 and supplies the line to the coefficient line sorting portion 104. Also, the line 6 of the subband 2LL is supplied to and held by the line buffer portion 102.

Then line 14 (fourteenth coefficient line from the top) and line 15 (fifteenth coefficient line from the top) on divided level 1 are generated, in that order, and supplied consecutively to the coefficient line sorting portion 104. The line 14 and line 15 of the subband 1LL are supplied to and held by the line buffer portion 102.

When two coefficient lines of the subband 1LL are held by the line buffer portion 102, analysis filtering on divided level 1 is performed on these lines. The wavelet transform portion 103 outputs the line 7 on divided level 2 and supplies the line to the coefficient line sorting portion 104. Also, the line 7 of the subband 2LL is supplied to and held by the line buffer portion 102.

When two coefficient lines of the subband 2LL are held by the line buffer portion 102, analysis filtering on divided level 2 is performed on these lines. The wavelet transform portion 103 outputs the line 3 on divided level 3 and supplies the line to the coefficient line sorting portion 104. Also, the line 3 of the subband 3LL is supplied to and held by the line buffer portion 102.

When three coefficient lines of the subband 3LL (two lines from the second time on) are held by the line buffer portion 102, analysis filtering on divided level 3 is performed on these lines. The wavelet transform portion 103 outputs line 1 on divided level 4 (4HH, 4HL, 4LH, and 4HH) and supplies the line to the coefficient line sorting portion 104.

Described above is a group of coefficient lines making up one line block output from the wavelet transform portion 103 in the initial state. At the end of the initial state, a steady state is reached in which the lines are processed two at a time.

Figure 10:
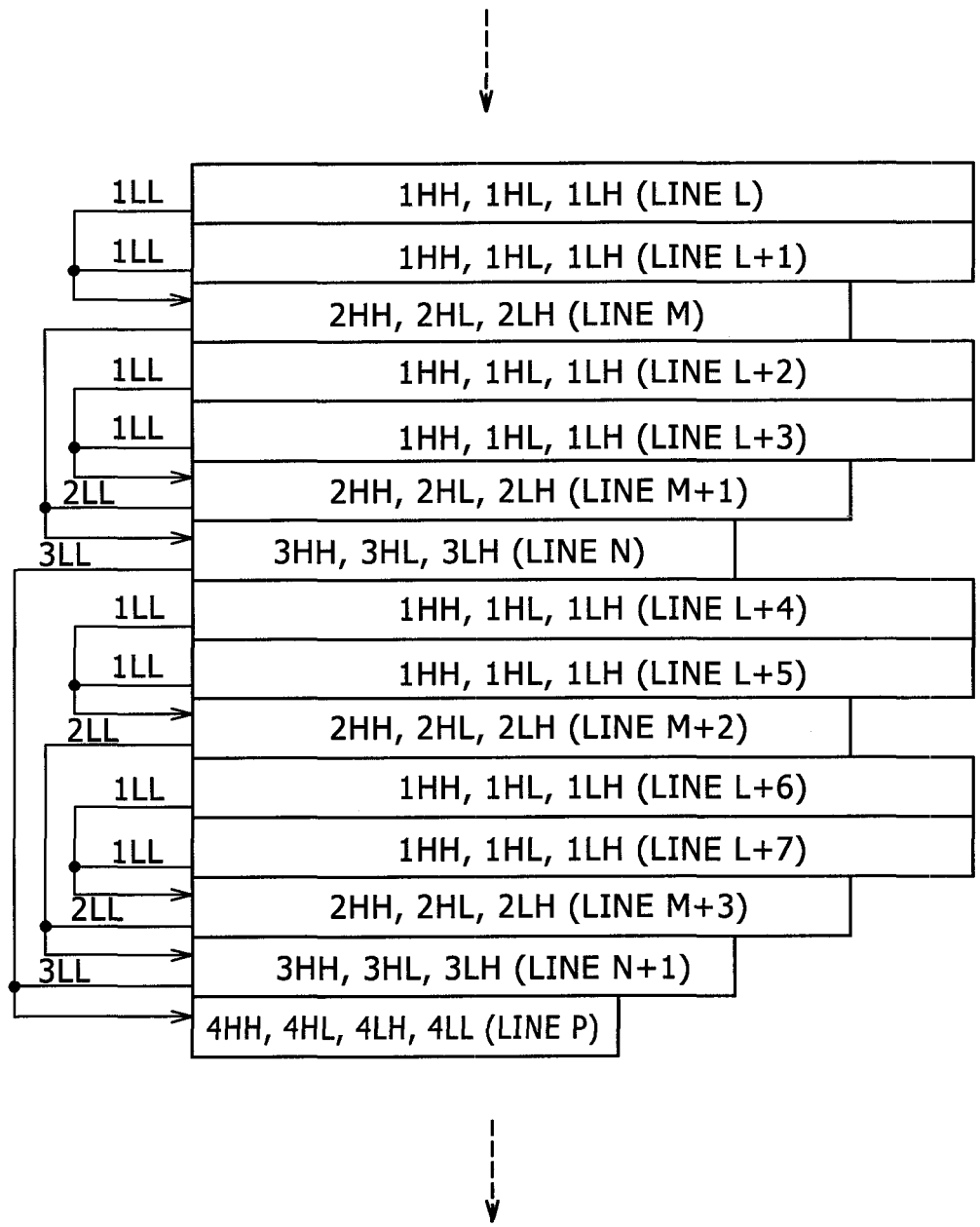
FIG. 10 is a schematic view explanatory of the order in which coefficient data is output.

FIG. 10 shows data output chronologically from the wavelet transform portion 103 in the steady state. In FIG. 10, as in FIG. 9, the data output from the wavelet transform portion 103 is arrayed chronologically from the top down.

The wavelet transform portion 103 performs analysis filtering in the steps described above. Thus at a given timing in the steady state, as soon as line L (L-th coefficient line from the top) and line (L+1) ((L+1)th coefficient line from the top) on divided level 1 are generated, these lines are output consecutively from the wavelet transform portion 103 and supplied to the coefficient line sorting portion 104. The line L and line (L+1) of the subband 1LL are supplied to and held by the line buffer portion 102.

When two coefficient lines of the subband 1LL are held by the line buffer portion 102, analysis filtering on divided level 1 is performed on these lines. The wavelet transform portion 103 outputs line M (M-th coefficient line from the top) on divided level 2 and supplies the line to the coefficient line sorting portion 104. Also, the line M of the subband 2LL is supplied to and held by the line buffer portion 102.

Then line (L+2) ((L+2)th coefficient line from the top) and line (L+3) ((L+3)th coefficient line from the top) on divided level 1 are generated, in that order, and supplied consecutively to the coefficient line sorting portion 104. The line (L+2) and line (L+3) of the subband 1LL are supplied to and held by the line buffer portion 102.

When two coefficient lines of the subband 1LL are held by the line buffer portion 102, analysis filtering on divided level 1 is performed on these lines. The wavelet transform portion 103 outputs line (M+1) ((M+1)th coefficient line from the top) on divided level 2 and supplies the line to the coefficient line sorting portion 104. Also, the line (M+1) of the subband 2LL is supplied to and held by the line buffer portion 102.

When two coefficient lines of the subband 2LL are held by the line buffer portion 102, analysis filtering on divided level 2 is performed on these lines. The wavelet transform portion 103 outputs line N (N-th coefficient line from the top) on divided level 3 and supplies the line to the coefficient line sorting portion 104. Also, the line N of the subband 3LL is supplied to and held by the line buffer portion 102.

Then line (L+4) ((L+4)th coefficient line from the top) and line (L+5) ((L+5)th coefficient line from the top) on divided level 1 are generated, in that order, and supplied consecutively to the coefficient line sorting portion 104. The line (L+4) and line (L+5) of the subband 1LL are supplied to and held by the line buffer portion 102.

When two coefficient lines of the subband 1LL are held by the line buffer portion 102, analysis filtering on divided level 1 is performed on these lines. The wavelet transform portion 103 outputs line (M+2) ((M+2)th coefficient line from the top) on divided level 2 and supplies the line to the coefficient line sorting portion 104. Also, the line (M+2) of the subband 2LL is supplied to and held by the line buffer portion 102.

Then line (L+6) ((L+6)th coefficient line from the top) and line (L+7) ((L+7)th coefficient line from the top) on divided level 1 are generated, in that order, and supplied consecutively to the coefficient line sorting portion 104. The line (L+6) and line (L+7) of the subband 1LL are supplied to and held by the line buffer portion 102.

When two coefficient lines of the subband 1LL are held by the line buffer portion 102, analysis filtering on divided level 1 is performed on these lines. The wavelet transform portion 103 outputs line (M+3) ((M+3)th coefficient line from the top) on divided level 2 and supplies the line to the coefficient line sorting portion 104. Also, the line (M+3) of the subband 2LL is supplied to and held by the line buffer portion 102.

When two coefficient lines of the subband 2LL are held by the line buffer portion 102, analysis filtering on divided level 2 is performed on these lines. The wavelet transform portion 103 outputs line (N+1) ((N+1)th coefficient line from the top) on divided level 3 and supplies the line to the coefficient line sorting portion 104. Also, the line (N+1) of the subband 3LL is supplied to and held by the line buffer portion 102.

When two coefficient lines of the subband 3LL are held by the line buffer portion 102, analysis filtering on divided level 3 is performed on these lines. The wavelet transform portion 103 outputs line P (P-th coefficient line from the top) on divided level 4 and supplies the line to the coefficient line sorting portion 104.

In the steady state described above, the lines are processed down to the lowermost line.

The order in which the wavelet transform portion 103 processes coefficient lines, i.e., the order in which the coefficient lines are output from the wavelet transform portion 103, may be determined as desired and thus may be different from the order explained above. Still, by performing analysis filtering in the above-described order, the wavelet transform portion 103 can generate coefficient lines efficiently and proceed with transform processing with low delay.

[Sorting of Coefficient Lines]

The coefficient lines on each divided level output from the wavelet transform portion 103 in the order discussed above in reference to FIGS. 9 and 10 are held by the coefficient line sorting buffer 111 in the coefficient line sorting portion 104. When one line block of coefficient lines is buffered, the coefficient line readout section 112 sorts the coefficient lines by reading them out in a predetermined order for encoding process which is different from the order of wavelet inverse transform process as well as from the order of transmission.

The order of wavelet transform and that of transmission will be discussed later. The order for encoding process is an order that allows the rate control portion 109 to be capable of estimating the degree of difficulty of encoding earlier. In other words, it is the order in which the coefficient line readout section 112 preferentially reads the coefficient lines the larger the feature quantity contained therein.

Generally, the lower the frequency component of the image signal, the larger the energy concentrated in the component. Conversely, edges and noise components that are difficult to sense visually tend to be reflected in the high-frequency component. That is, since fewer coefficients exist in the high-frequency component than in other components, attempts to encode such coefficients in the high-frequency component help to determine the degree of difficulty in encoding the image of interest earlier.

Therefore, the coefficient line readout section 112 reads coefficient lines in the order going from the high-component component to the low-frequency component as shown in FIG. 11, for example.

In FIG. 11, the coefficient lines are arrayed in the processing order. The time-line is shown going from the top down in FIG. 11. That is, the coefficient lines in FIG. 11 are processed from the top down.

Stated another way, the coefficient lines output from the wavelet transform portion 103 in the order shown on the left side of FIG. 11 (i.e., order of wavelet transform output) are sorted by the coefficient line sorting portion 104 into the order going from the high-frequency component to the low-frequency component (order of encoding) as shown on the right side of FIG. 11.

More specifically, the coefficient line readout section 112 reads the coefficient lines on divided level 1, then the coefficient lines on divided level 2, the coefficient lines on divided level 3, and finally the coefficient line on divided level 4, before supplying the quantization portion 105 with the coefficient lines in the order in which they were read out.

The quantization portion 105 processes the coefficient lines in the order in which they have been supplied before supplying them to the entropy encoding portion 106. The entropy encoding portion 106 also processes the coefficient lines in the order shown on the left side of FIG. 11. That is, the order in which the coefficient line readout section 112 has read out the coefficient lines also serves as the order of encoding.

The rate control portion 109 may perform control in such a manner that if coefficient values are smaller, the quantization step size is reduced to promote code amount generation and that if the coefficient values are larger, the step size is enlarged to suppress code amount generation. When carrying out such control based on the code amount of the high-frequency component, the rate control portion 109 can estimate the degree of difficulty in image encoding more accurately.

That is, with the above-described sorting process making it possible to be capable of estimating the degree of difficulty in image encoding earlier, the rate control portion 109 can set an appropriate number of quantization steps earlier than ever. In other words, rate control becomes easier than before.

In the case of the image encoding apparatus 100, it is necessary to encode images with low delay. The rate control portion 109 is required to perform rate control within a very limited time period in parallel with entropy encoding on the basis of very limited information (i.e., code amount per coefficient line).

If rate control were not carried out appropriately, unwanted image quality deterioration could be incurred. Then the image encoding apparatus 100 might not be implemented as a practical apparatus. Thus it is very significant to perform appropriate rate control over a limited time period based on limited information. The higher the throughput of the image encoding apparatus 100, the higher the degree of difficulty in carrying out such rate control.

When the coefficient line sorting portion 104 sorts the coefficient lines as described above, it is possible to set the appropriate number of quantization steps earlier and make rate control easier. This allows the rate control portion 109 to deal with ever-increasing throughput. That is, the image encoding apparatus 100 can further increase the throughput of image encoding.

Obviously, the order in which the coefficient lines are sorted by the coefficient line sorting portion 104 may be different from the order discussed above. Still, for the reasons explained above, it is generally preferable to adopt the order in which coefficient lines are sorted starting from the high-frequency component and going to the low-frequency component.

The sorting of coefficient lines may be performed before entropy encoding; it may also be carried out after quantization. That is, the coefficient line sorting portion 104 may be located interposingly between the quantization portion 105 and the entropy encoding portion 106. In this case, the coefficient lines output from the wavelet transform portion 103 are quantized by the quantization portion 105 before being forwarded to and held by the coefficient line sorting buffer 111.

[Addition of Code Amount]

As discussed above, the addition portion 107 adds to each encoded line the code amount of that encoded line as header information. FIG. 12 shows how such additions are provided.

In the example of FIG. 12, the addition portion 107 adds the code amount of the encoded line (code word) on each divided level to that encoded line as head information thereof (Code_info). For example, if the code amount of the encoded line on divided level 1 (line L) is 100 bytes, the information indicative of "100 bytes" is added, say, to the head of that encoded line as header information (Code_info (L)).

As explained above, the components of the image encoding apparatus 100 handle coefficient data in units of a coefficient line. That is, the components can identify the boundaries between coefficient lines. On the other hand, an image decoding apparatus that decodes the encoded data generated by the image encoding apparatus 100 cannot identify these boundaries between the encoded lines because these lines are supplied continuously to the decoding apparatus.

For that reason, the addition portion 107 adds the code amount of each encoded line to the encoded data. Based on the code amount thus added, the image decoding apparatus can divide the encoded data (i.e., stream) into encoded lines for processing purposes.

[Sorting of Encoded Lines]

The encoded lines on each divided level, after being encoded in the order explained above in reference to FIG. 11 (i.e., output from the addition portion 107), are held by the encoded line sorting buffer 121 in the encoded line sorting portion 108. When one line block of encoded lines is buffered, the encoded line readout section 122 sorts the encoded lines by reading them out from the order of encoding process into a predetermined order for transmission which is different from the order of wavelet inverse transform process.

The order of wavelet inverse transform process will be discussed later. The order for transmission is an order fit for transmitting encoded data (code stream). For example, it may be an order that helps enhance the resistance to the instability of the available transmission rate.

Diverse paths are conceivable over which encoded data is transmitted from the image encoding apparatus 100 to the image decoding apparatus. For example, where encoded data is transmitted over the Internet, wireless communication paths or the like of which the available transmission rate is unstable and over which data losses, transmission errors, and other irregularities are highly likely to occur, setting up a practical system requires taking suitable countermeasures against such problems into consideration.

Thus the encoded line readout section 122 may read encoded lines starting from the low-frequency component and going to the high-frequency component, as shown in FIG. 13, for example.

In FIG. 13, the encoded lines are arrayed in the order in which they were processed. The time-line is shown going from the top down in FIG. 13. That is, the encoded lines in FIG. 13 are processed from the top down in the figure.

Stated another way, the encoded lines output from the addition portion 107 in the order starting from the high-frequency component and going to the low-frequency component (i.e., encoding order) as shown on the left side of FIG. 13 are sorted by the encoded line sorting portion 108 into the order starting from the low-frequency component and going to the high-frequency component (i.e., transmission order) as indicated on the right side of FIG. 13.

More specifically, the encoded line readout section 122 reads first the encoded lines on divided level 4, then the encoded lines on divided level 3, the encoded lines on divided level 2, and finally the encoded lines on divided level 1, before outputting to the outside of the image encoding apparatus 100 the encoded lines in the order in which they were read out. That is, the encoded lines are transmitted in that transmission order (i.e., the order starting from the low-frequency component and going to the high-frequency component).

As mentioned above, the lower the frequency component, the larger the energy of the image concentrated in that component. That is, the lower the frequency component of the encoded line, the greater the effect the line exerts on image quality. In other words, the lower the frequency component of a given encoded line, the greater the importance of that encoded line in terms of image quality, so that the encoded line in question is to be transmitted earlier than other lines.

If a data loss occurs during transmission of an encoded line, the lost data is retransmitted. Where image is encoded and transmitted in such a manner as to be decoded with as little delay as possible (i.e., approximately in real time), the time for retransmitting the lost data is limited to a very short period. To make delay as short as possible requires the retransmission time to be as short as possible as well.

In such a case, prolonging the available time for data retransmission even by a limited time period is very significant because it can improve the possibility of successful retransmission.

If the encoded lines were not sorted and in the order in which the lines were encoded, i.e., when transmitted starting from the high-frequency component and going to the low-frequency component, the time allowed for retransmitting encoded lines of the low-frequency component would be very short, reducing the succeeding rate of retransmitting. As a result, there would be a growing possibility that the quality of decoded images is deteriorated. In particular, where an unstable network is used as transmission paths, a certain amount of such errors is anticipated, which makes the drop in decoded picture quality more or less inevitable.

As another example, the available transmission rate may suddenly drop over a wireless transmission path or the like in such a manner that the bit rate of the image encoding apparatus 100 fails to keep up with that transmission rate. In such a case, there may be a possibility that an increased amount of the encoded lines being buffered upon transmission incurs an overflow or leads to a prolonged delay time. In the face of such an eventuality, the transmission rate may be lowered by discarding the encoded lines of the high-frequency component to be transmitted later so as not to transmit. That is, the transmission of the encoded lines in question may be cancelled halfway through and the next line block may start to be transmitted.

Under the above-described control, it is possible not only to avoid buffer overflows but also to maintain transmission with low delay. If encoded lines of the high-frequency component were transmitted earlier than those of the low-frequency lines, the latter lines would have to be discarded, which could result in a major deterioration of the quality of decoded images. Where encoded lines of the low-frequency component are transmitted earlier than those of the high-frequency component, the latter lines need only be discarded so as to deal with the error. Thus controlling the transmission rate as described above can lower the adverse effects of the discarding on the quality of decoded images just as effectively.

The higher the throughput, it should be noted, the higher the possibility that the above-discussed type of error will occur during transmission.

As described above, when the encoded line sorting portion 108 sorts encoded lines into the order in which they are transmitted (e.g., starting from the low-frequency component and going to the high-frequency component), the image encoding apparatus 100 can enhance its resistance to the instability of transmission paths. If the drop in that resistance incurs errors and other irregularities during transmission resulting in a major deterioration of the quality of decoded images, the system involved may not be said to be a practical system.

That is, improving the resistance to the instability of transmission paths enables the image encoding apparatus 100 to handle a further increase in throughput. In other words, the image encoding apparatus 100 can further boost the throughput of image encoding.

For example, if the circumstances guarantee that no error will occur during transmission, the encoded line sorting portion 108 should preferably sort encoded line into the order in which the encoded lines undergo wavelet inverse transform process in order to minimize delay.

As another example, if the responsiveness of rate control is sufficient (i.e., if sufficiently suitable rate control can be performed), the coefficient line sorting portion 104 should preferably sort coefficient lines into the order of transmission or into that of wavelet inverse transform process.

However, where attempts are made to boost the throughput of encoding or decoding by simply raising, say, operation clock rate, processing may not be carried out practically if the responsiveness of rate control or the resistance to the instability of transmission paths is not sufficiently provided.

The image encoding apparatus 100 can practically implement enhanced throughput by suitably sorting coefficient lines or encoded lines as explained above.

[Flow of Processing]

Figure 14:
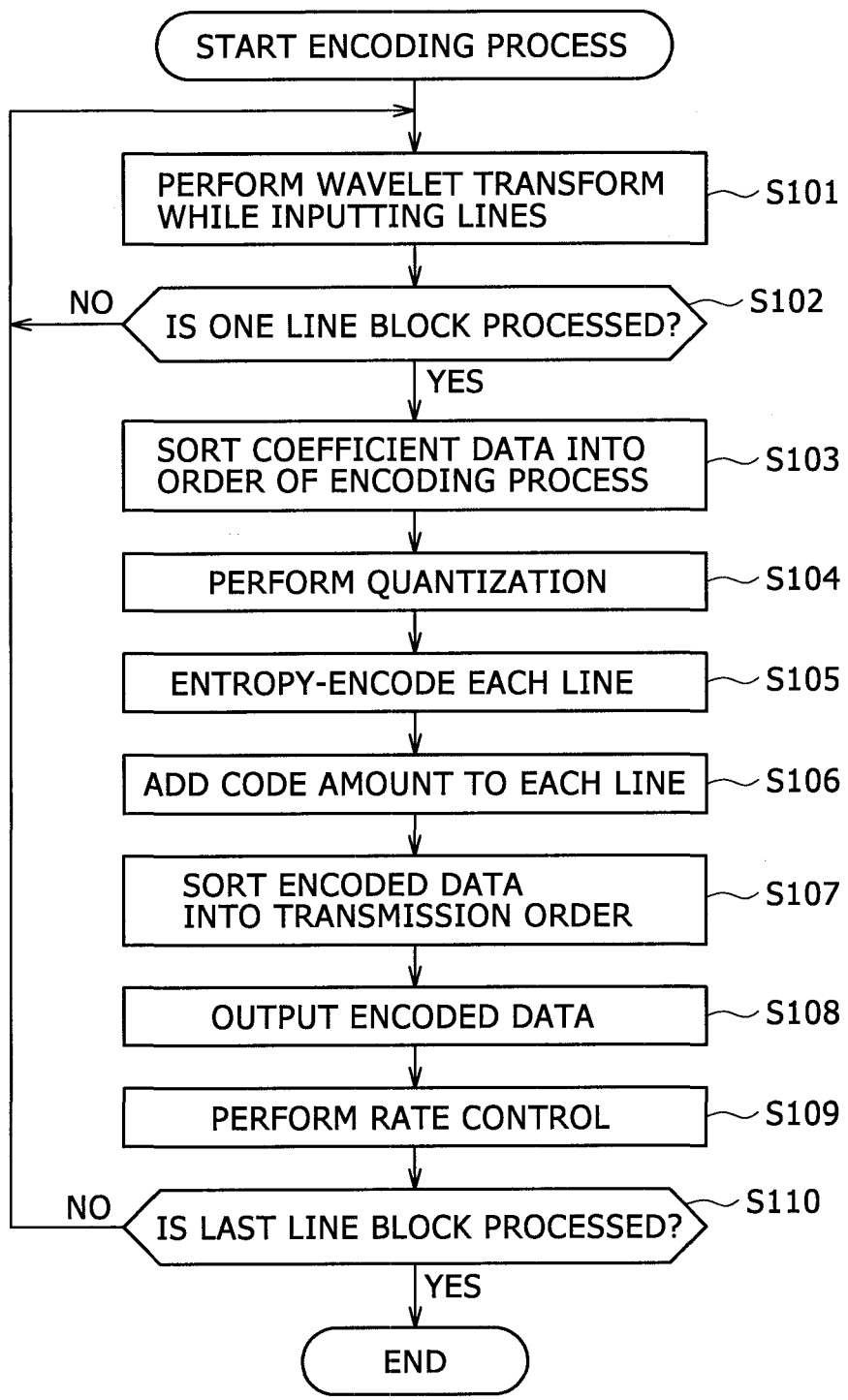
FIG. 14 is a flowchart explanatory of a typical flow of an encoding process.

Explained below in reference to the flowchart of FIG. 14 is a typical flow of the encoding process performed as discussed above by the components of the image encoding apparatus 100. It is to be noted that, this encoding process is carried out on every picture of an input image.

When the encoding process is started and step S101 is reached, the image line input portion 101 receives image data on a line by line basis (i.e., gets the received data held by the line buffer portion 102), while the wavelet transform portion 103 subjects one line block to wavelet transform using the coefficient lines held by the line buffer portion 102.

In step S102, the wavelet transform portion 103 determines whether one line block has been processed. If it is determined that one line block has yet to be processed, step S101 is reached again and wavelet transform is continued.

If it is determined that wavelet transform is completed on one line block, step S103 is reached.

In step S103, the coefficient line sorting portion 104 sorts the coefficient data having undergone wavelet transform into the order of encoding process. In step S104, the quantization portion 105 quantizes the coefficient data using the quantization step size designated by the rate control portion 109.

In step S105, the entropy encoding portion 106 entropy-encodes the coefficient data. In step S106, the addition portion 107 adds the code amount of each encoded line to that line as header information. In step S107, the encoded line sorting portion 108 sorts the encoded data (encoded lines) into the order of transmission. In step S108, the encoded line sorting portion 108 outputs the encoded data sorted in the transmission order.

In step S109, the rate control portion 109 performs rate control based on information about the entropy encoding performed by the entropy encoding portion 106.

In step S110, the wavelet transform portion 103 determines whether the last line block of a process target picture (e.g., the lowermost line block) has been processed. If it is determined that the last line block has yet to be processed, step S101 is reached again and the subsequent process is repeated on the next line block. If it is determined in step S110 that the last line block has been processed, the encoding process on the process target picture in question is terminated.

By carrying out the encoding process as explained above, the image encoding apparatus 100 can boost the throughput of image encoding.

[Other Examples of Identifying the Boundaries Between Encoded Lines]

Figure 15:
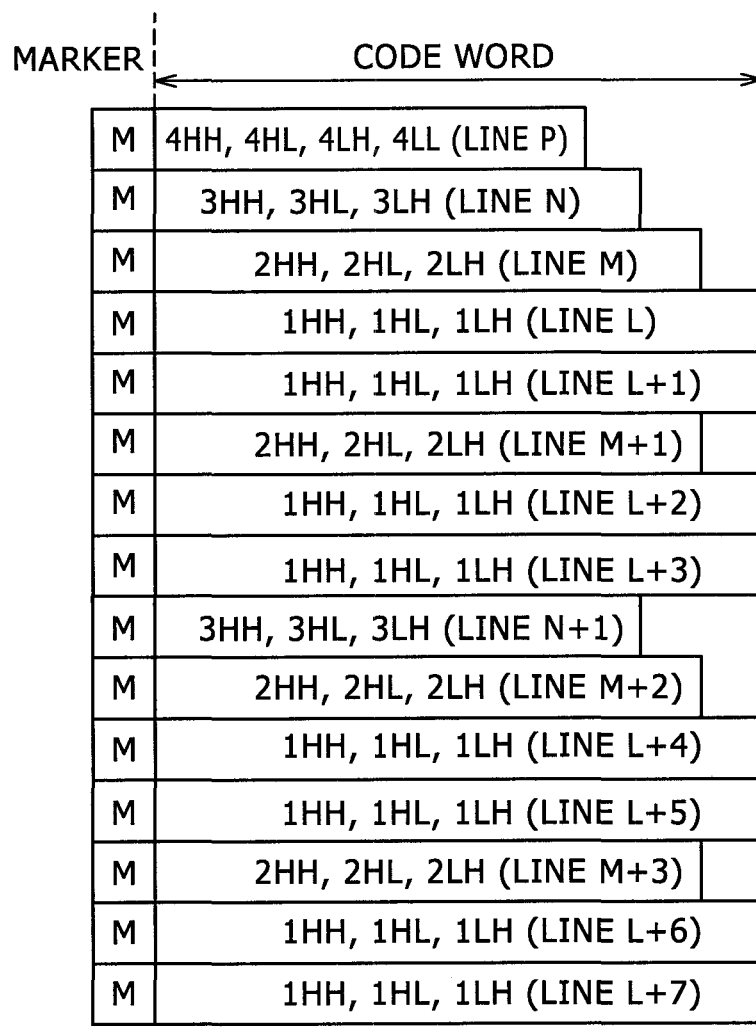
FIG. 15 is a schematic view explanatory of an example in which markers are added.

In reference to FIG. 12, it was explained above how the encoded line on each divided level is prefixed with header information including the code amount of the line so that the image decoding apparatus may identify the boundaries between the encoded lines on each divided level in the code stream. Alternatively, the boundaries between encoded lines may be identified by adding dedicated markers to the lines as shown in FIG. 15. By detecting these markers, the image decoding apparatus can identify the boundaries between the encoded lines on each divided level. In this case, however, the image decoding apparatus can distinguish the encoded lines on each divided level based on these markers but cannot determine the code amount of each of these lines. That is, the markers do not directly allow the image decoding apparatus to identify the order in which the encoded lines were sorted on each divided level. Thus, the image decoding apparatus needs to utilize some other means to identify the sorting order.

2. Second Embodiment

[Device Structure]

Figure 16:
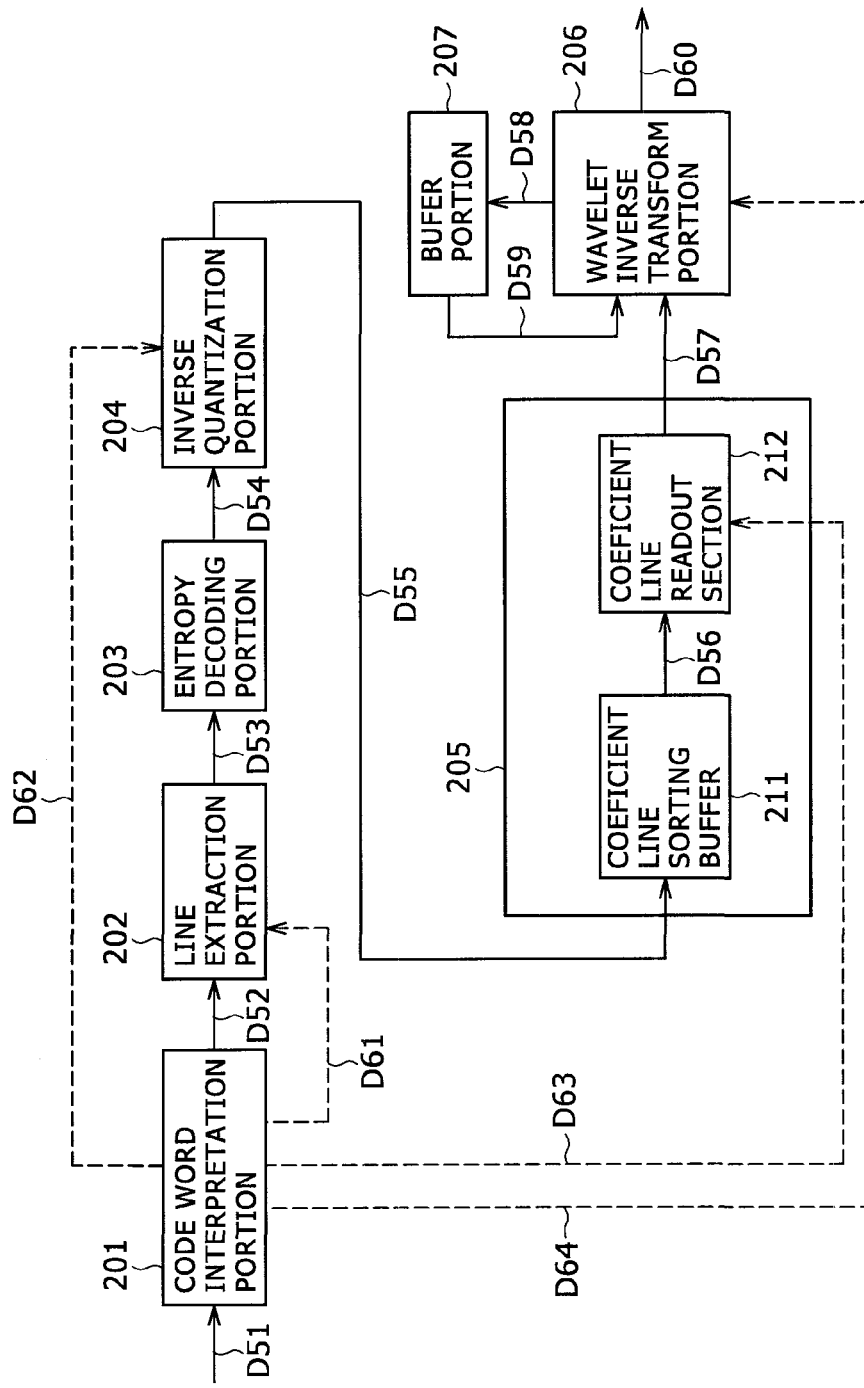
FIG. 16 is a block diagram showing a typical major structure of an image decoding apparatus to which the present invention is applied.

Explained below is an image decoding apparatus corresponding to the image encoding apparatus 100 discussed above as the first embodiment. FIG. 16 is a block diagram showing a typical structure of an image decoding apparatus implemented as another image processing apparatus to which this invention is applied.

The image decoding apparatus 200 decodes encoded data output from the image encoding apparatus 100 so as to generate decoded images.

The image decoding apparatus 200 includes a code word interpretation portion 201, a line extraction portion 202, an entropy decoding portion 203, an inverse quantization portion 204, a coefficient line sorting portion 205, a wavelet inverse transform portion 206, and a buffer portion 207.

The code word interpretation portion 201 interprets input encoded data (code word) (arrow D51) to extract related information about the data and the encoding process involved. The related information may contain any kind of information, such as image resolution (horizontal and vertical sizes), quantization step size, the number of decompositions of wavelet transform, and sorting order of coefficient lines (encoded lines).

The information about the sorting order of coefficient lines (encoded lines) may be any kind of information as long as the information indicates the order in which the encoded lines on each divided level are sorted or the information is that which is needed to obtain such a sorting order. For example, the information may be the header information including the code amount of the encoded line on each divided level as shown in FIG. 12, or the detected markers or the like as indicated in FIG. 15.

The code word interpretation portion 201 supplies input encoded data (code stream) to the line extraction portion 202 (arrow D52). Also, the code word interpretation portion 201 supplies the line extraction portion 202 with information necessary for distinguishing the encoded lines on each divided level in the code stream (broken line arrow D61). For example, the code word interpretation portion 201 supplies the code amount of the encoded line on each divided level, detected markers, etc., to the line extraction portion 202.

The code word interpretation portion 201 also supplies information indicative of the quantization step size to the inverse quantization portion 204 (broken line arrow D62).

Furthermore, the code word interpretation portion 201 supplies a coefficient line readout section 212 with information necessary for sorting the coefficient lines on each divided level (broken line arrow D63). The coefficient line readout section 212 holds beforehand the order of a wavelet inverse transform process to be performed by the wavelet inverse transform portion 206. The coefficient line readout section 212 needs to take hold of the order in which the encoded lines were sorted upon transmission, i.e., the earlier order prior to sorting of the coefficient lines. Thus the code word interpretation portion 201 provides the coefficient line readout section 212 with information indicative of the order in which the encoded line were sorted upon transmission or with information necessary for obtaining such a sorting order.

For example, by interpreting the code words, the cord word interpretation portion 201 may identify the order in which the encoded lines were sorted upon transmission and feed information indicative of that sorting order to the coefficient line readout section 212. As another example, the code word interpretation portion 201 may provide the coefficient line readout section 212 successively with information which was extracted from the code stream and which indicates the code amount of the encoded line on each divided level. In this case, the coefficient line readout section 212 takes hold of the sorting order of the coefficient lines based on the order of the code amounts supplied from the code word interpretation portion 201.

A coefficient line sorting buffer 211 stores the coefficient lines on each divided level in such a manner that these lines can be distinguished from one another. Thus the coefficient line readout section 212 may acquire the data amount of the coefficient line on each divided level held by the coefficient line sorting buffer 211, and take hold of the order in which the coefficient lines are sorted based on the sorting order of the data amounts. In this case, the code word interpretation portion 201 need not provide information.

Furthermore, the code word interpretation portion 201 supplies the wavelet inverse transform portion 206 with information necessary for wavelet inverse transform process, such as the resolution of the image and the number of decompositions of wavelet transform (broken line arrow D64).

The line extraction portion 202 extracts the encoded lines on each divided level from the code stream fed from the code word interpretation portion 201, on the basis of the information which comes from the code word interpretation portion 201 and which is necessary for distinguishing the encoded lines on each divided level. That is, the line extraction portion 202 divides the encoded data (code stream) into the encoded lines on the divided levels. The line extraction portion 202 feeds the extracted encoded lines on each divided level to the entropy decoding portion 203 (arrow D53).

The entropy decoding portion 203 entropy-decodes the encoded lines on each divided level to generate coefficient data (quantization coefficient), by use of a method corresponding to the entropy encoding performed by the entropy encoding portion 106 (FIG. 1). That is, the entropy decoding portion 203 decodes the encoded lines on each divided level in the order they are supplied following the division by the line extraction portion 202, thereby transforming the encoded lines into coefficient lines on the divided levels. The entropy decoding portion 203 supplies the inverse quantization portion 204 with the coefficient lines (quantization coefficients) on the divided level of interest (arrow D54).

The inverse quantization portion 204 inverse-quantizes the coefficient lines (quantization coefficients) on each divided level fed from the entropy decoding portion 203, in accordance with the quantization step size determined on the basis of the information sent from the code word interpretation portion 201. The inverse quantization portion 204 supplies the coefficient line sorting portion 205 with the inverse-quantized coefficient lines (wavelet transform coefficients) on each divided level (arrow D55).

The coefficient line sorting portion 205 sorts the coefficient data (coefficient lines), from the earlier order (in which the data was transmitted) into the order of the wavelet inverse transform process.

As shown in FIG. 16, the coefficient line sorting portion 205 includes the coefficient line sorting buffer 211 and coefficient line readout section 212. The coefficient line sorting buffer 211 holds the coefficient lines on each divided level sent from the inverse quantization portion 204. The coefficient line readout section 212 sorts the coefficient lines on each divided level held by the coefficient line sorting buffer 211, by reading out the lines in the order for wavelet inverse transform process (arrow D56). This sorting process will be discussed later in detail.

The coefficient line sorting portion 205 (coefficient line readout section 212) feeds the sorted coefficient data to the wavelet inverse transform portion 206 (arrow D57).

Based on the information sent from the code word interpretation portion 201, the wavelet inverse transform portion 206 performs an inverse process of the wavelet transform carried out by the wavelet transform portion 103 (FIG. 1) so as to generate decoded images. Wavelet inverse transform will be discussed later in detail.

The wavelet inverse transform portion 206 performs wavelet inverse transform by repeating synthesis filtering that synthesizes the low-frequency and high-frequency components of coefficient data. At this point, the coefficient data of one hierarchical level lower generated by the wavelet inverse transform portion 206 through synthesis filtering is sent to and held by the buffer portion 207 (arrow D58) for use in the next synthesis filtering. That is, in addition to the coefficient data fed from the coefficient line readout section 212 (arrow D57), the wavelet inverse transform portion 206 uses the coefficient data (arrow D59) retrieved as needed from the buffer portion 207 when carrying out synthesis filtering.

After restoring the decoded image by repeating synthesis filtering as described above, the wavelet inverse transform portion 206 outputs the image data to the outside of the image decoding apparatus 200 (arrow D60).

[Sorting of Coefficient Lines]

As discussed above in reference to FIG. 13, the encoded lines on each divided level are transmitted in a predetermined order (e.g., starting from the low-frequency component and going to the high-frequency component).

The coefficient line sorting portion 205 sorts the coefficient lines on each divided level from the transmission order into the order of wavelet inverse transform process. The coefficient lines on each divided level are held by the coefficient line sorting buffer 211 in the coefficient line sorting portion 205. When one line block of coefficient lines is buffered, the coefficient line readout section 212 sorts the coefficient lines by reading them out in the order of wavelet transform process.

As will be discussed later in detail, one pass of synthesis filtering turns the coefficient line of each subband on a given hierarchical level into two coefficient lines of a low-frequency subband in the horizontal and vertical directions of one hierarchical level lower.

In the wavelet inverse transform process, such synthesis filtering is repeated in a predetermined order. Although that order may be determined as desired, synthetic filtering should preferably be performed preferentially from the lowest practical hierarchical level upward in order to minimize delay.

Thus the coefficient line sorting portion 205 sorts the coefficient lines on each divided level into a predetermined order that allows the wavelet inverse transform portion 206 to perform wavelet inverse transform process in the above-described manner so as not to necessitate unwanted wait time.

Figure 17:
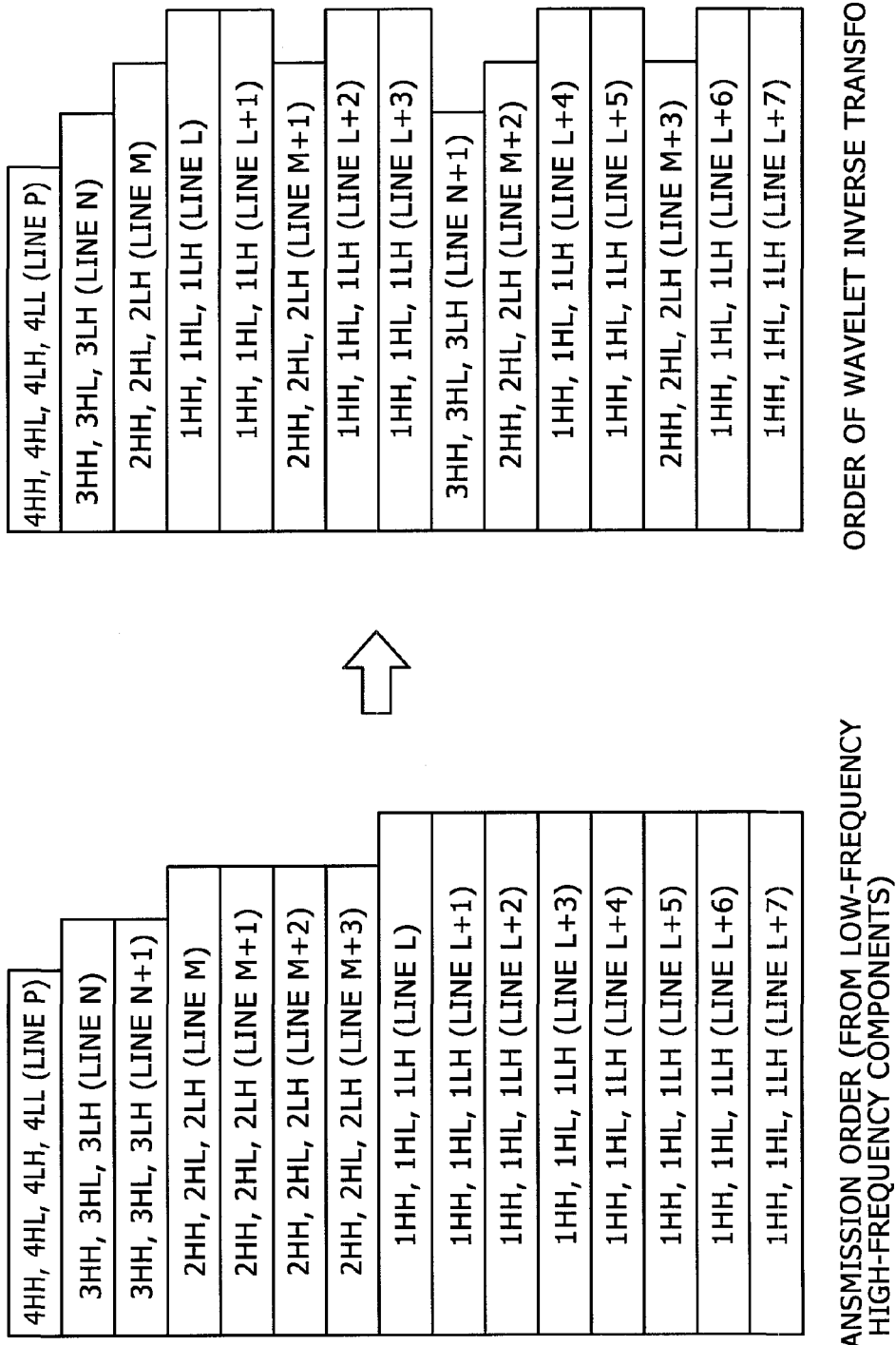
FIG. 17 is a schematic view explanatory of how coefficient data after decoding is sorted.

FIG. 17 shows an example of the sorting above. In FIG. 17, the coefficient lines are arrayed in the order in which they are to be processed. The time-line is shown going from the top down in FIG. 17. That is, the coefficient lines in FIG. 17 are processed from the top down in the figure.

The coefficient lines on each divided level output from the inverse quantization portion 204 in the order shown on the left side of FIG. 17 (i.e., order of transmission) are sorted by the coefficient line sorting portion 205 into the order indicated on the right side of FIG. 17 (i.e., order of wavelet inverse transform).

That is, the coefficient lines on each divided level are stored in the coefficient line sorting buffer 211 in the order shown on the left side of FIG. 17. On the other hand, the coefficient line readout section 212 reads the coefficient lines on each divided level from the coefficient line sorting buffer 211 in the order shown on the right side of FIG. 17.

More specifically, the coefficient line readout section 212 reads the coefficient line of line P on divided level 4, the coefficient line of line N on divided level 3, the coefficient line of line M on divided level 2, the coefficient line of line L on divided level 1, and the coefficient line of line (L+1) on divided level 1, in that order.

Then, the coefficient line readout section 212 reads the coefficient line of line (M+1) on divided level 2, the coefficient line of line (L+2) on divided level 1, and the coefficient line of line (L+3) on divided level 1, in that order.

Then, the coefficient line readout section 212 reads the coefficient line of line (N+1) on divided level 3, the coefficient line of line (M+2) on divided level 2, the coefficient line of line (L+4) on divided level 1, and the coefficient line of line (L+5) on divided level 1, in that order.

Next, the coefficient line readout section 212 reads the coefficient line of line (M+3) on divided level 2, the coefficient line of line (L+6) on divided level 1, and the coefficient line of line (L+7) on divided level 1, in that order.

The wavelet inverse transform portion 206 performs synthesis filtering using the coefficient lines as they are supplied in the order explained above.

As described, the coefficient line sorting portion 205 sorts the coefficient lines on each divided level supplied in a transmission order different from the order of wavelet inverse transform process, into the order of wavelet inverse transform process in units of a line block. This makes it easy to manage the coefficient data in the wavelet inverse transform process, so that the wavelet inverse transform portion 206 can perform the wavelet inverse transform process with less delay.

That is, even where the encoded lines on each divided level are transmitted in a transmission order different from the order of the wavelet transform process, the image decoding apparatus 200 can decode the encoded data with a minimum of delay. In other words, the image decoding apparatus 200 can boost its throughput in decoding the encoded data.

FIG. 17 shows how one line block is sorted in the steady state. The method of sorting in the initial state corresponding to the example of FIG. 17 can be readily identified based on that example in FIG. 17 and in reference to the differences of sorting between the initial state and the steady state shown in FIGS. 9 and 10. For that reason, the sorting method in the initial state will not be discussed further.

[Lifting Calculation]

The wavelet inverse transform portion 206 performs wavelet inverse transform using the method corresponding to the wavelet transform process carried out by the wavelet transform portion 103. For example, if the wavelet transform portion 103 performs analysis filtering using the 5×3 filter as described above, the wavelet inverse transform portion 206 carries out synthesis filtering also using the 5×3 filter.

Synthesis filtering is performed basically in the same manner as analysis filtering; the former process is carried out simply in reverse order of the latter. That is, in the case of synthesis filtering, the calculation of the filtering process can also be reduced by use of the lifting technique illustrated in FIG. 3.

Figure 18:
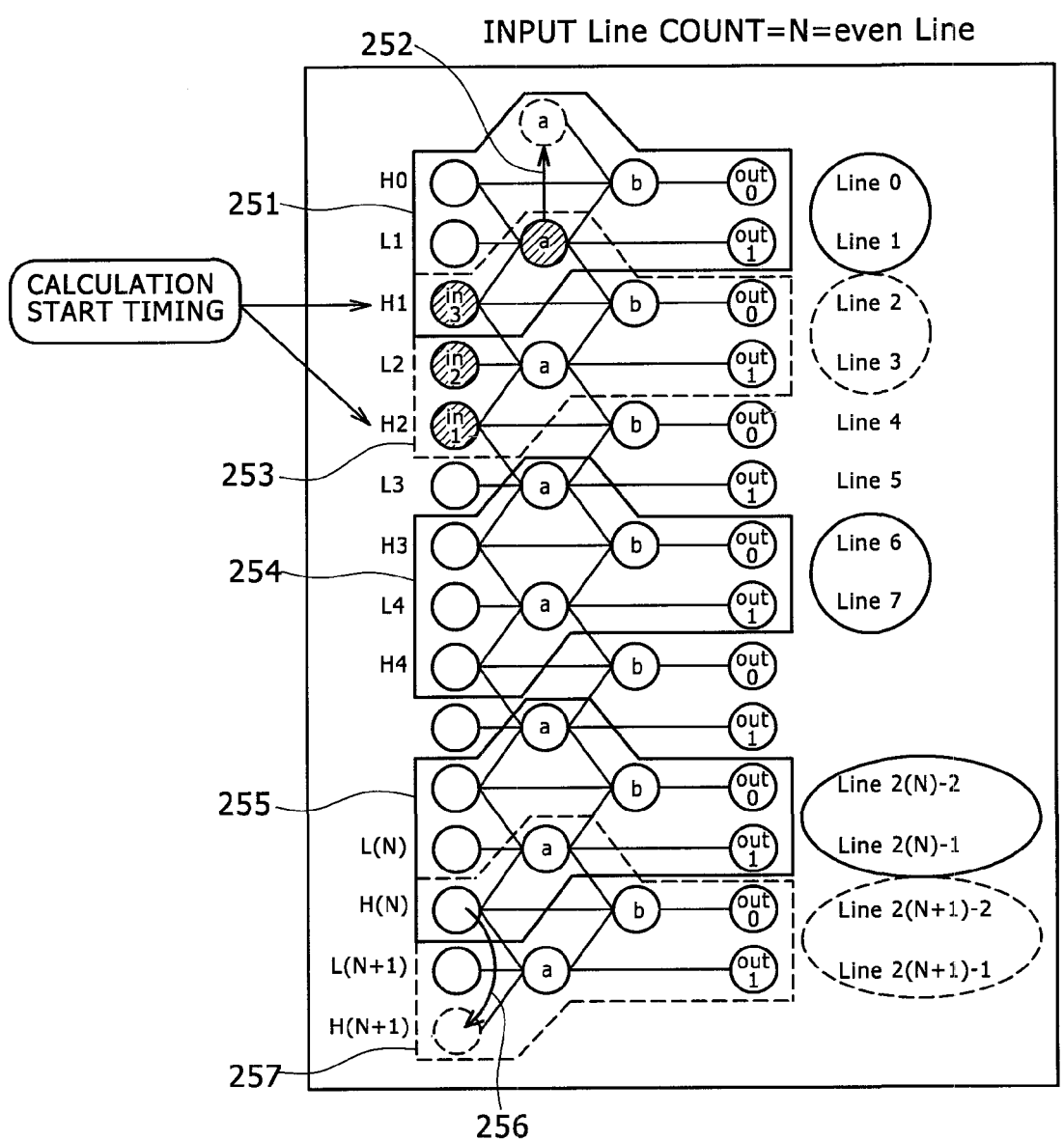
FIG. 18 is a schematic view explanatory of an example of lifting calculation.

FIG. 18 shows an example in which filtering is performed on lines arrayed in the lengthwise direction by use of a 5×3 synthesis filter. The horizontal direction denotes the progress of the calculation and low-order coefficients generated thereby. As with analysis filtering, the processing in the horizontal direction is performed in the same manner as the processing in the vertical direction.

In the top part of the image, as indicated by frame 215, lifting calculation is performed the moment a high-frequency coefficient (H0), a low-frequency coefficient (L1), and another high-frequency coefficient (H1) are input. At this point, a coefficient "a" is symmetrically expanded as indicated by arrow 252. In this manner, Line-0 and Line 1 on one hierarchical level lower are generated.

Next, when two coefficient lines (low-frequency component L2 and high-frequency component H2) are input, Line-2 and Line-3 on one hierarchical level lower are generated as indicated by frame 253.

Thereafter, every time two coefficient lines are input, the above-described lifting calculation is repeated likewise on the subsequent lines, and two low-order coefficient lines are output. When Line-2(N)−2 and Line-2(N)−1 are generated with regard to an input low-frequency coefficient (L(N)) and high-frequency coefficient (H(N)) as indicated by frame 255, the high-frequency coefficient (H(N)) is symmetrically expanded as indicated by arrow 256. Calculations are then carried out as indicated by frame 257, and Line-2(N+1)−2 and Line-2(N+1)−1 are generated thereby.

[Synthesis Filtering in Units of a Line Block]

The above-described synthesis filtering (lifting) is performed recursively on each hierarchical level. It follows that the number of lines is doubled every time one hierarchical level lower is reached.

Figure 19:
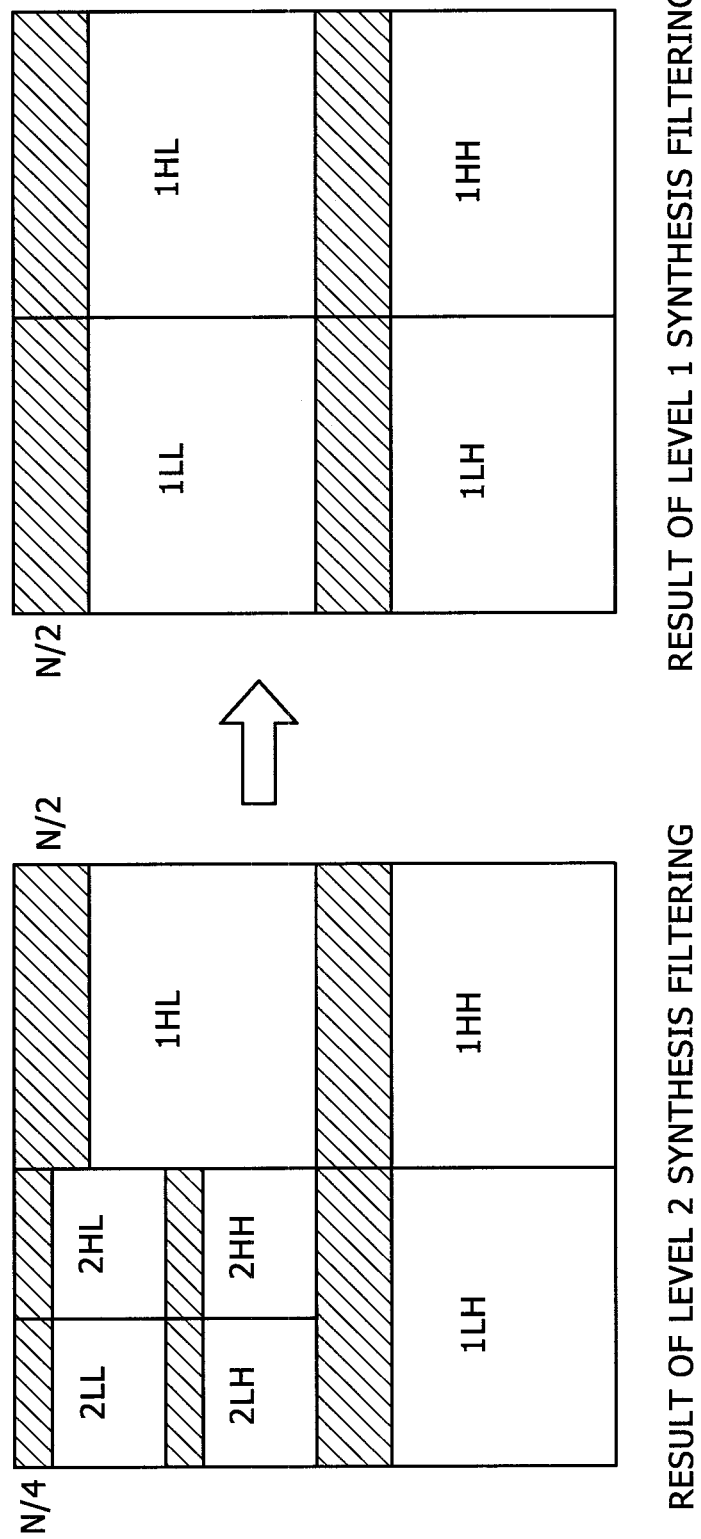
FIG. 19 is a schematic view explanatory of how a synthesis filtering process is performed.

For example, suppose that the coefficient line on divided level 2 is N/4 as shown in FIG. 19. In this case, carrying out synthesis filtering on the subbands 2LL, 2LH, 2HL, and 2HH on divided level 2 generates the subband 1LL on divided level 1 for N/2 lines.

[Processing Order of Coefficient Lines]

What follows is a more specific explanation of a typical procedure of the above-described synthesis filtering carried out by the wavelet inverse transform portion 206.

Figure 20:
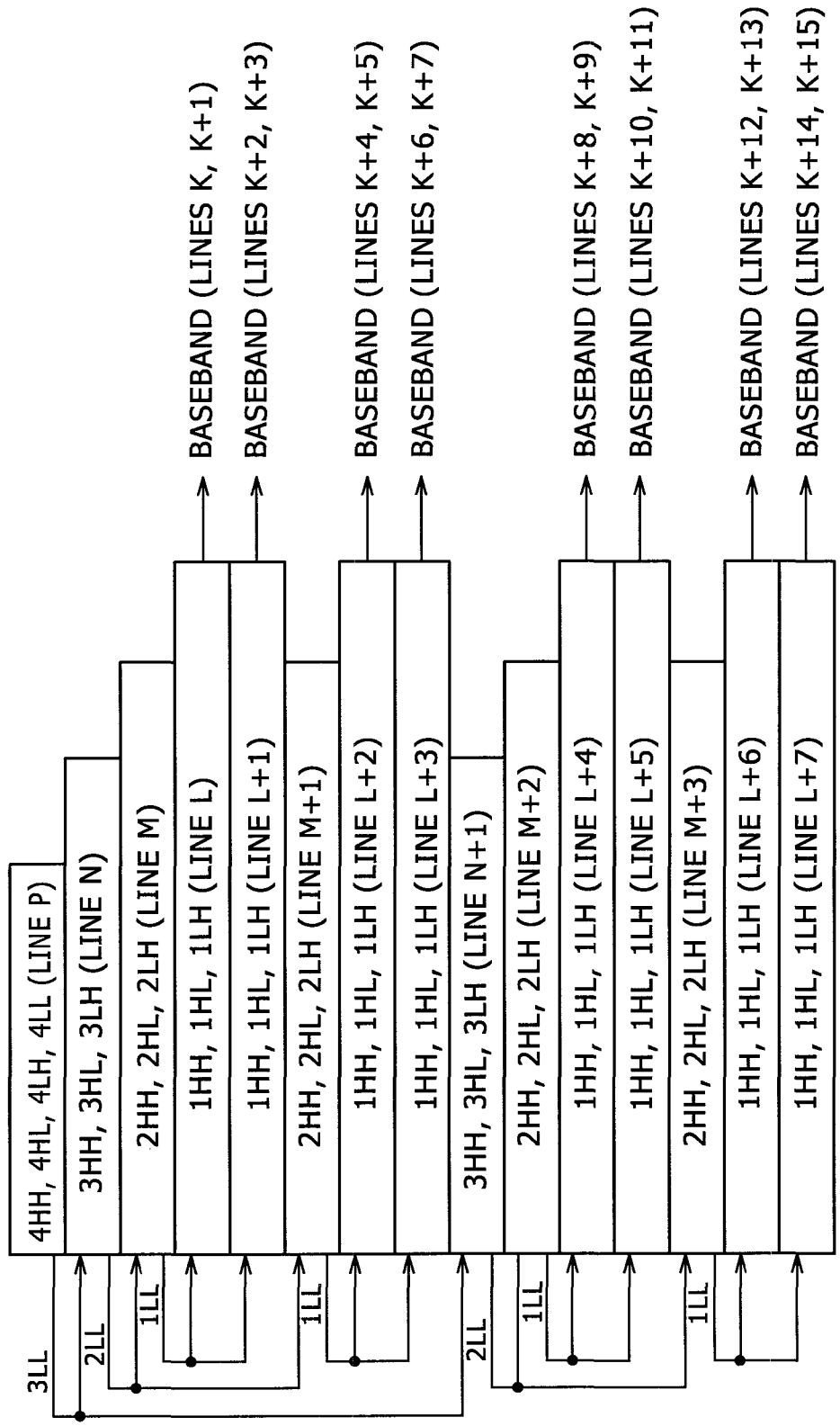
FIG. 20 is a schematic view explanatory of a typical order in which coefficient data is processed.

FIG. 20 chronologically shows data to be processed by the wavelet inverse transform portion 206 in the steady state. In FIG. 20, the data to be handled by the wavelet inverse transform portion 206 is arrayed chronologically from the top down in the figure.

When wavelet-transforming one line block in the steady state, the wavelet inverse transform portion 206 first performs synthesis filtering on one coefficient line (line P) of each of the subbands (subbands 4HH, 4HL, 4LH, and 4LL) on divided level 4 to generate two coefficient lines (line N and line (N+1)) of the subband 3LL on divided level 3. Of these coefficient lines, the coefficient line of line (N+1) is supplied to and held by the buffer portion 207.

Then the wavelet inverse transform portion 206 performs synthesis filtering on the subband 3LL (line N) on divided level 3 and one coefficient line (line N) of each of the other subbands (subbands 3HH, 3HL, and 3LH) to generate two coefficient lines (line M and line (M+1)) of the subband 2LL on divided level 2. Of these coefficient lines, the coefficient line of line (M+1) is supplied to and held by the buffer portion 207.

Then, the wavelet inverse transform portion 206 performs synthesis filtering on the subband 2LL (line M) on divided level 2 and one coefficient line (line M) of each of the other subbands (subbands 2HH, 2HL, and 2LH) to generate two coefficient lines (line L and line (L+1)) of the subband 1LL on divided level 1. Of these coefficient lines, the coefficient line of line (L+1) is supplied to and held by the buffer portion 207.

Then, the wavelet inverse transform portion 206 performs synthesis filtering on the subband 1LL (line L) on divided level 1 and one coefficient line (line L) of each of the other subbands (subbands 1HH, 1HL, and 1LH) to generate two lines (line K and line (K+1)) of the baseband image data. These two lines are output to the outside of the image decoding apparatus 200.

Then, the wavelet inverse transform portion 206 reads the subband 1LL (line (L+1)) on divided level 1 from the buffer portion 207 and subjects it to synthesis filtering together with one coefficient line (line (L+1)) of each of the other subbands (subbands 1HH, 1HL, and 1LH) so as to generate two lines (line (K+2) and line (K+3)) of the baseband image data. These two lines are output to the outside of the image decoding apparatus 200.

Then, the wavelet inverse transform portion 206 reads the subband 2LL (line (M+1)) on divided level 2 from the buffer portion 207 and subjects it to synthesis filtering together with one coefficient line (line (M+1)) of each of the other subbands (subbands 2HH, 2HL, and 2LH) so as to generate two coefficient lines (line (L+2) and line (L+3)) of the subband 1LL on divided level 1. Of these coefficient lines, the coefficient line of line (L+3) is supplied to and held by the buffer portion 207.

Then, the wavelet inverse transform portion 206 performs synthesis filtering on the subband 1LL (line (L+2)) on divided level 1 and one coefficient line (line (L+2)) of each of the other subbands (subbands 1HH, 1HL, and 1LH) to generate two lines (line (K+4) and line (K+5)) of the baseband image data. These two lines are output to the outside of the image decoding apparatus 200.

Then, the wavelet inverse transform portion 206 reads the subband 1LL (line (L+3)) on divided level 1 from the buffer portion 207 and subjects it to synthesis filtering together with one coefficient line (line (L+3)) of each of the other subbands (subbands 1HH, 1HL, and 1LH) so as to generate two lines (line (K+6) and line (K+7)) of the baseband image data. These two lines are output to the outside of the image decoding apparatus 200.

Then, the wavelet inverse transform portion 206 reads the subband 3LL (line (N+1)) on divided level 3 from the buffer portion 207 and subjects it to synthesis filtering together with one coefficient line (line (N+1)) of each of the other subbands (subbands 3HH, 3HL, and 3LH) so as to generate two coefficient lines (line (M+2) and line (M+3)) of the subband 2LL on divided level 2. Of these coefficient lines, the coefficient line of line (M+3) is supplied to and held by the buffer portion 207.

Then, the wavelet inverse transform portion 206 performs synthesis filtering on the subband 2LL (line (M+2)) on divided level 2 and one coefficient line (line (M+2)) of each of the other subbands (subbands 2HH, 2HL, and 2LH) to generate two coefficient lines (line (L+4) and line (L+5)) of the subband 1LL on divided level 1. Of these coefficient lines, the coefficient line of line (L+5) is supplied to and held by the buffer portion 207.

Then, the wavelet inverse transform portion 206 performs synthesis filtering on the subband 1LL (line (L+4)) on divided level 1 and one coefficient line (line (L+4)) of each of the other subbands (subbands 1HH, 1HL, and 1LH) to generate two lines (line (K+8) and line (K+9)) of the baseband image data. These two lines are output to the outside of the image decoding apparatus 200.

Then, the wavelet inverse transform portion 206 reads the subband 1LL (line (L+5)) on divided level 1 from the buffer portion 207 and subjects it to synthesis filtering together with one coefficient line (line (L+5)) of each of the other subbands (subbands 1HH, 1HL, and 1LH) so as to generate two lines (line (K+10) and line (K+11)) of the baseband image data. These two lines are output to the outside of the image decoding apparatus 200.

Then, the wavelet inverse transform portion 206 reads the subband 2LL (line (M+3)) on divided level 2 from the buffer portion 207 and subjects it to synthesis filtering together with one coefficient line (line (M+3)) of each of the other subbands (subbands 2HH, 2HL, and 2LH) so as to generate two coefficient lines (line (L+6)) and line (L+7)) of the subband 1LL on divided level 1. Of these coefficient lines, the coefficient line of line (L+7) is supplied to and held by the buffer portion 207.

Then, the wavelet inverse transform portion 206 performs synthesis filtering on the subband 1LL (line (L+6)) on divided level 1 and one coefficient line (line (L+6)) of each of the other subbands (subbands 1HH, 1HL, and 1LH) to generate two lines (line (K+12) and line (K+13)) of the baseband image data. These two lines are output to the outside of the image decoding apparatus 200.

Then, the wavelet inverse transform portion 206 reads the subband 1LL (line (L+7)) on divided level 1 from the buffer portion 207 and subjects it to synthesis filtering together with one coefficient line (line (L+7)) of each of the other subbands (subbands 1HH, 1HL, and 1LH) so as to generate two lines (line (K+14) and line (K+15)) of the baseband image data. These two lines are output to the outside of the image decoding apparatus 200.

The wavelet inverse transform portion 206 performs synthesis filtering according to the above-described procedure. In so doing, the wavelet inverse transform portion 206 carries out wavelet inverse transform on each line block of coefficient lines to generate 16 lines of the baseband image data.

Consequently, the coefficient line sorting portion 205 performs the sorting illustrated in FIG. 17 in keeping with the above-described order of wavelet inverse transform. The sorting causes the coefficient lines to be fed to the wavelet inverse transform portion 206 in the order in which the lines are needed for repeated synthesis filtering. This makes it possible for the wavelet inverse transform portion 206 to carry out wavelet inverse transform process with a minimum of delay without incurring unwanted wait time.

The differences in the array of coefficient lines between the initial state and the steady state are as shown in FIGS. 9 and 10. Thus, the procedure for wavelet inverse transform process on line blocks in the initial state can be readily obtained by getting these differences in FIGS. 9 and 10 reflected in the example of FIG. 20. For this reason, the procedure for wavelet inverse transform process will not be discussed further.

Obviously, the order of the coefficient lines after they are sorted by the coefficient line sorting portion 205 can also be acquired easily by getting the differences in FIGS. 9 and 10 reflected likewise in the example of FIG. 13.

[Line Block Transform]

In the manner described above, the image encoding apparatus 100 and image decoding apparatus 200 perform wavelet transform and wavelet inverse transform (encoding and decoding processes) processes, on image data (and encoded data) in units of a line block.

Figure 21:
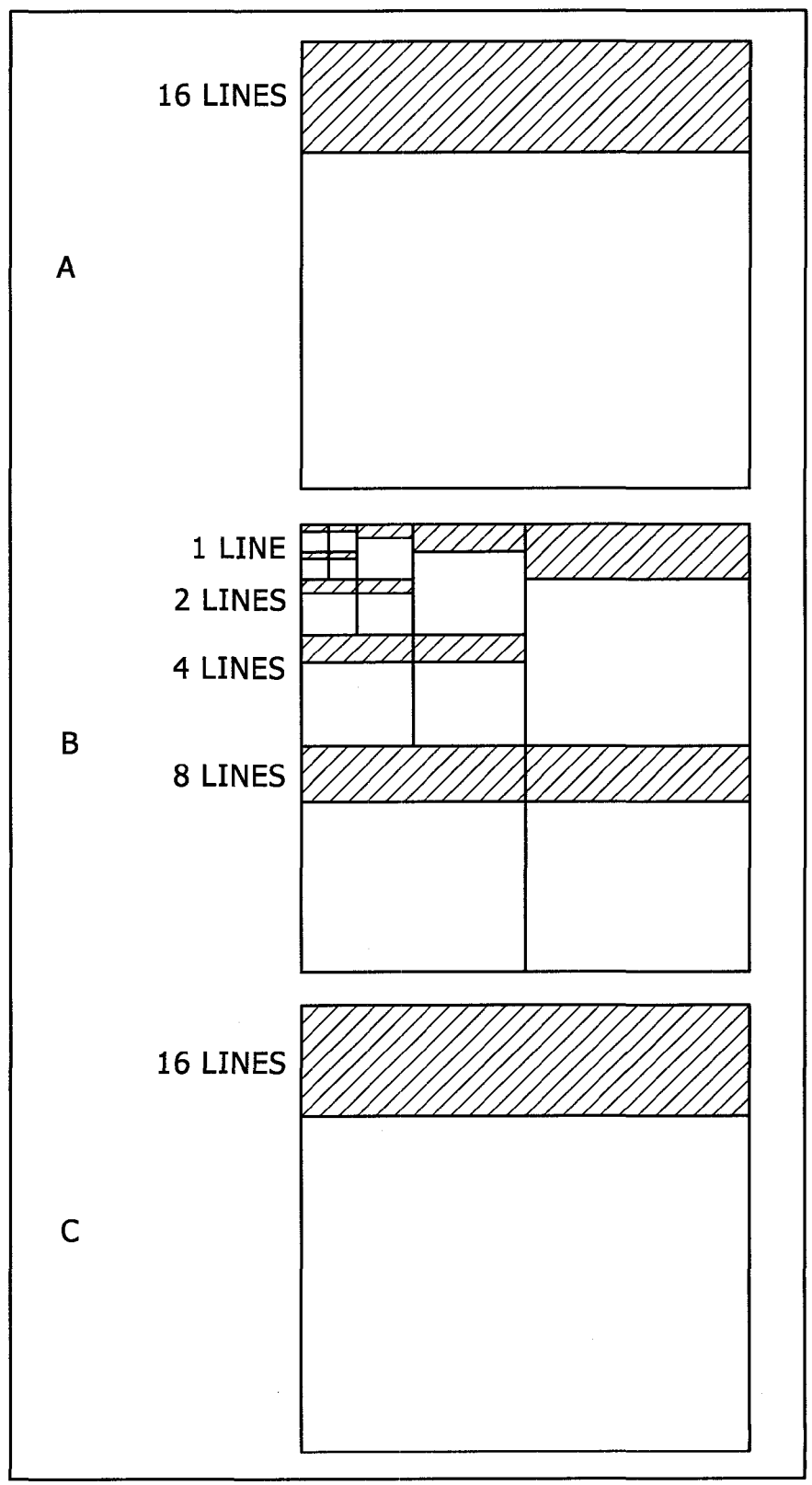
FIG. 21 is a schematic view explanatory of how a line block transform process is performed.

Therefore, one line block made up of 16 lines of the baseband image data as indicated by reference character A in FIG. 21 for example, is wavelet-transformed by the image encoding apparatus 100 into eight coefficient lines on divided level 1, four coefficient lines on divided level 2, two coefficient lines on divided level 3, and one coefficient line on divided level 4 as indicated by reference character B in FIG. 21.

These coefficient lines are subjected to wavelet inverse transform by the image decoding apparatus 200 and are turned thereby into 16 lines of the baseband image data (decoded image) as indicated by reference character C in FIG. 21.

[Flow of Processing]

Figure 22:
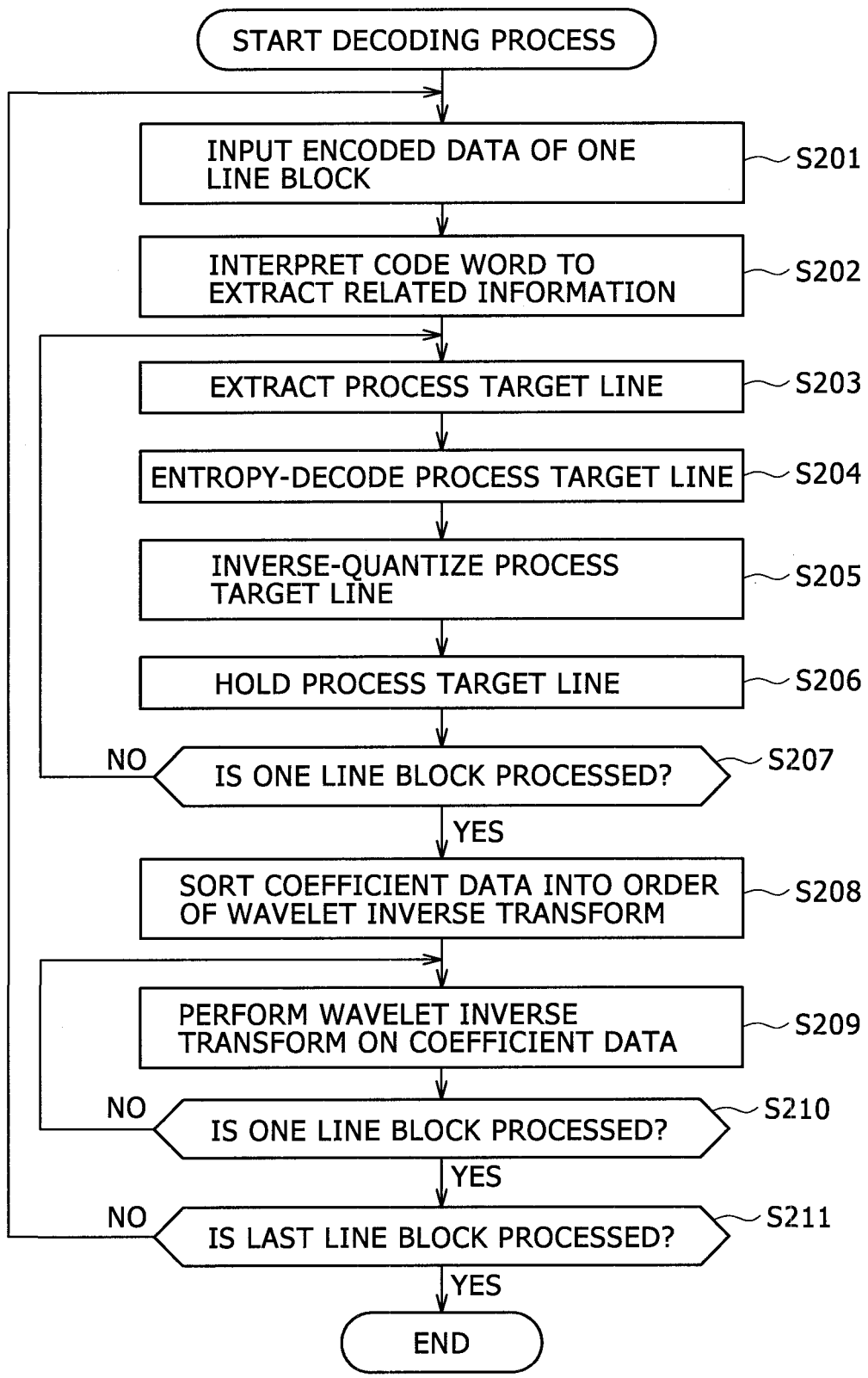
FIG. 22 is a flowchart explanatory of a typical flow of a decoding process.

Explained below in reference to the flowchart of FIG. 22 is a typical flow of the decoding process performed as discussed above by the components of the image decoding apparatus 200. This decoding process is carried out on each set of the encoded data corresponding to one picture.

When the decoding process is started and step S201 is reached, the code word interpretation portion 201 receives the input of one line block of encoded data. In step S202, the code word interpretation portion 201 interprets the code word of the input encoded data and extracts related information therefrom. Based on the related information thus extracted, the code word interpretation portion 201 feeds necessary information to the processing portions involved.

In step S203, the line extraction portion 202 extracts a process target line based on the information supplied from the code word interpretation portion 201 (e.g., code amount).

In step S204, the entropy decoding portion 203 entropy-decodes the process target line fed from the line extraction portion 202. In step S205, the inverse quantization portion 204 inverse-quantizes the process target line. In step S206, the coefficient line sorting buffer 211 holds the process target line.

In step S207, the line extraction portion 202 determines whether one line block has been processed. If it is determined that there still exist coefficient lines yet to be processed, step S203 is reached again and the subsequent processing is repeated. If it is determined in step S207 that one line block has been processed, then step S208 is reached.

In step S208, the coefficient line readout section 212 sorts the coefficient data into the order of wavelet inverse transform by reading the coefficient data from the coefficient line sorting buffer 211. In step S209, the wavelet inverse transform portion 206 performs wavelet inverse transform on the coefficient data.

In step S210, the wavelet inverse transform portion 206 determines whether one line block has been processed. If it is determined that there still exist coefficient lines yet to be processed, step S209 is reached again and the subsequent processing is repeated. If it is determined in step S210 that one line block has been processed, then step S211 is reached.

In step S211, the code word interpretation portion 201 determines whether the last line block of the process target picture (e.g., the lowermost line block) has been processed. If it is determined that the last line block has yet to be processed, step S201 is reached again and the subsequent processing is repeated on the next line block. If it is determined in step S211 that the last line block has been processed, then the decoding process on the process target picture is terminated.

By carrying out the decoding process as described above, the image decoding apparatus 200 can boost its throughput in decoding the encoded data.

In the foregoing description, the coefficient line sorting portion 205 was shown to sort the coefficient lines from the transmission order into the order of wavelet inverse transform. The transmission order refers to the order in effect upon transmission of the encoded data. For example, if the image encoding apparatus 100 transmits encoded lines in the order in which they were encoded, the coefficient line sorting portion 205 sorts the coefficient lines from the order in which they were encoded into the order of wavelet inverse transform. As another example, if the image encoding apparatus 100 transmits encoded lines in the order in which they were wavelet-transformed, the coefficient line sorting portion 205 sorts the coefficient lines from the order of wavelet transform into the order of wavelet inverse transform. As a further example, if the image encoding apparatus 100 transmits encoded lines in the order of wavelet inverse transform, the coefficient line sorting portion 205 outputs the coefficient lines in the same order of wavelet inverse transform.

Because the coefficient line sorting portion 205 can determine the sorting order of the input coefficient lines on the basis of the information supplied from the code word interpretation portion 201, it is easy for the coefficient line sorting portion 205 to sort the lines accordingly. That is, regardless of the order in which the input coefficient lines were sorted, the coefficient line sorting portion 205 can readily sort the coefficient lines into the order of wavelet inverse transform on the basis of the information fed from the code word interpretation portion 201.

3. Third Embodiment

[System Configuration]

Figure 23:
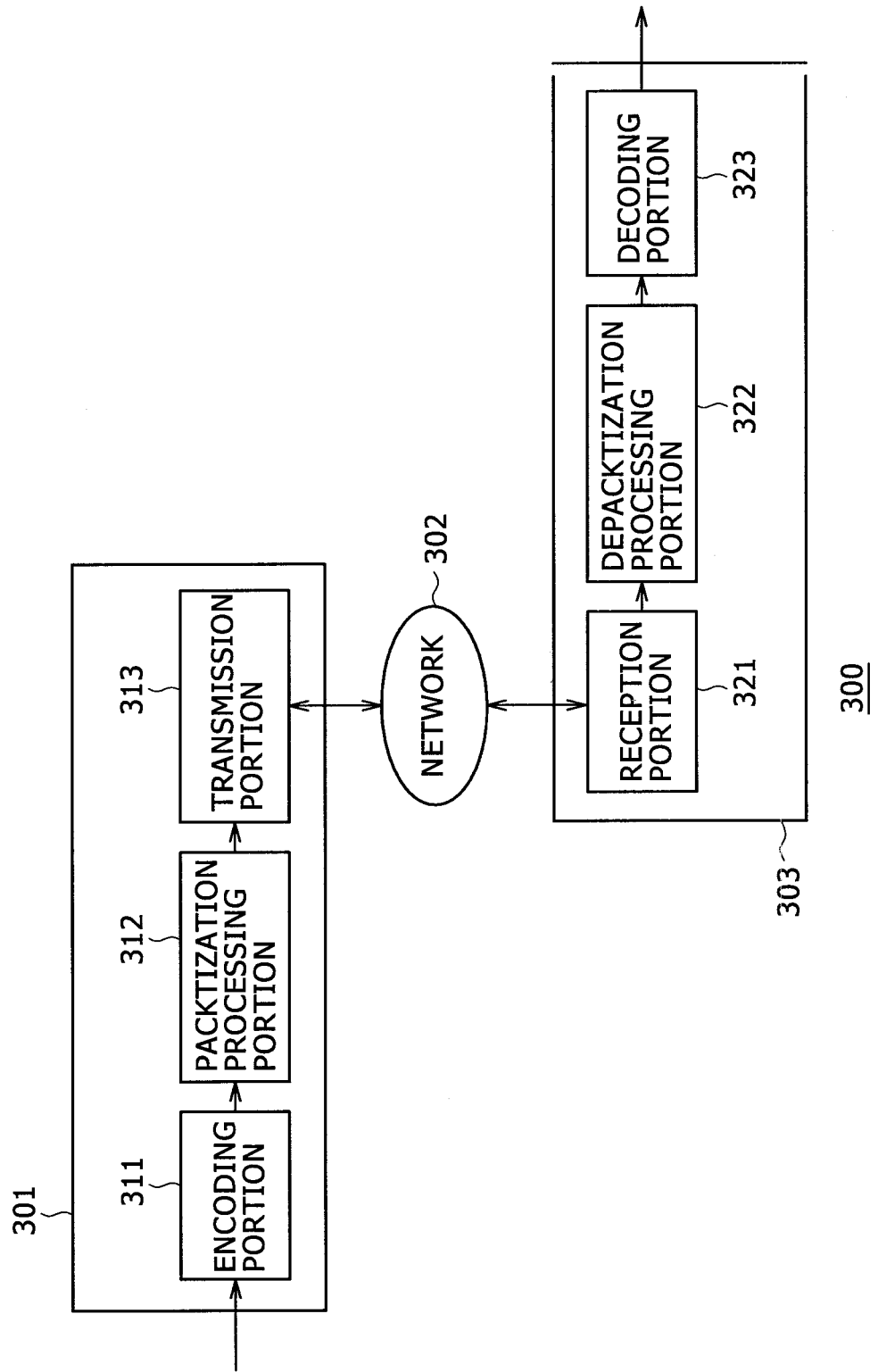
FIG. 23 is a block diagram showing a typical major structure of an image transmission system to which the present invention is applied.

Explained below is how the image encoding apparatus 100 described as the first embodiment and the image decoding apparatus 200 described as the second embodiment can be applied in an example. FIG. 23 shows a typical configuration of an image transmission system whereby an input image is encoded and transmitted and whereby the encoded data is decoded into a decoded image at a destination of the transmission, so that the decoded image thus acquired is output at the destination.

An image transmission system 300 is a system that transmits images with a minimum of delay. The image transmission system 300 includes a transmission apparatus 301 and a reception apparatus 303 interconnected via a network 302.

The transmission apparatus 301 is an apparatus that transmits the input image to the reception apparatus 303 over the network 302. In order to transmit the image efficiently, the transmission apparatus 301 encodes the image data and sends the encoded data to the reception apparatus 303.

The transmission apparatus 301 includes an encoding portion 311, a packetization processing portion 312, and a transmission portion 313.

The encoding portion 311 encodes the input image and outputs the encoded data. The image encoding apparatus 100 explained above as the first embodiment is applied to the encoding portion 311. That is, the encoding portion 311 has the same structure as the image encoding apparatus 100 and performs the same processing as that apparatus 100.

The packetization processing portion 312 packetizes the encoded data (code stream) output from the encoding portion 311. The transmission portion 313 sends the packets generated by the packetization processing portion 312 to a reception portion 321 over the network 302.

The network 302, such as the Internet and wireless LAN, constitutes unstable transmission paths which have no stably available communication band and which may develop packet losses and transmission/reception errors. The network 302 may be structured as desired as long as it offers transmission paths that may be unstable as a whole in characteristics.

The reception apparatus 303 receives packets sent from the transmission apparatus 301 over the network 302, decodes the encoded data contained in the packets to generate a decoded image, and outputs the decoded image.

The reception apparatus 303 includes a reception portion 321, a depacketization processing portion 322, and a decoding portion 323.

The reception portion 321 performs processing corresponding to the transmission portion 313 in the transmission apparatus 301. The reception portion 321 receives packets sent from the transmission portion 313 via the network.

The depacketization processing portion 322 depacketizes the packets received by the reception portion 321 and extracts encoded data therefrom.

The decoding portion 323 decodes the encoded data extracted by the depacketization processing portion 322 to output a decoded image. The image decoding apparatus 200 explained above as the second embodiment is applied to the decoding portion 323. That is, the decoding portion 323 has the same structure as the image decoding apparatus 200 and performs the same processing as that apparatus 200.

Where the image encoding apparatus 100 is applied in this manner as the encoding portion 311, the transmission apparatus 301 can exercise rate control easily and improve its resistance to the instability of transmission paths. Also, where the image decoding apparatus 200 is applied as the decoding portion 323, the reception apparatus 303 can perform data management easily upon wavelet inverse transform. Even when the transmission apparatus 301 carries out rate control easily and exercises control to boost its resistance to the instability of transmission paths, the reception apparatus 300 can perform decoding with a minimum of delay.

For example, if a packet loss and the like occur during communication between the transmission portion 313 and the reception portion 321, the reception portion 321 requests retransmission of the lost packets from the transmission portion 313. The encoding portion 311 outputs the encoded lines on each divided level starting from the low-frequency component and going to the high-frequency component, as discussed above. In this manner, the lower the frequency component significantly affecting image quality, the earlier the transmission thereof carried out by the transmission portion 313. In other words, if an error occurs and the reception portion 321 makes a retransmission request, longer time can be allotted to the retransmission process, the lower the frequency component to be retransmitted which greatly affects image quality.

If the band frequency of the network 302 abruptly drops, the transmission portion 313 may cancel and curtail packet transmission halfway through to deal with the sudden rate change. In such a case, if the low-frequency component greatly affecting image quality is transmitted earlier than the others, the adverse effects of the transmission control on image quality can be minimized.

That is, the image transmission system 300 can boost its throughput for the image data transmission process as a whole.

4. Fourth Embodiment

[Personal Computer]

The series of processes described above may be executed either by hardware or by software. In such cases, the processes may be handled by a personal computer such as one shown in FIG. 24.

Figure 24:
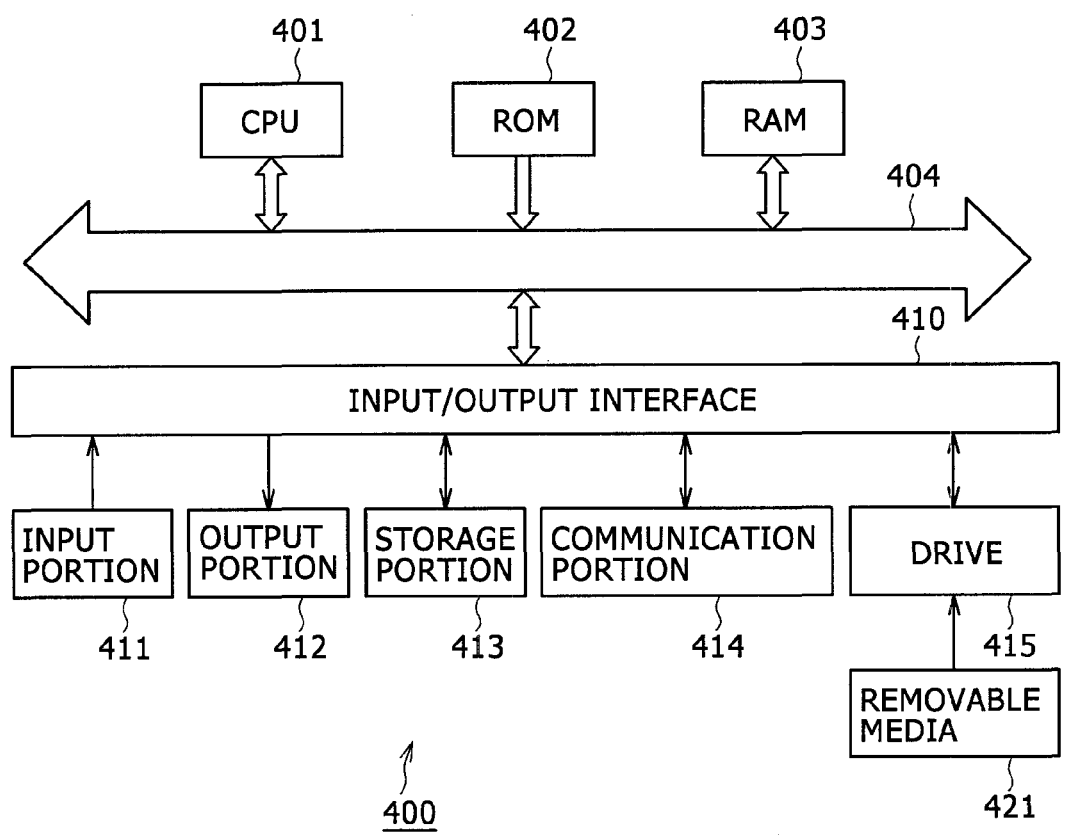
FIG. 24 is a block diagram showing a typical major structure of a personal computer to which the present invention is applied.

In FIG. 24, a CPU 401 of the personal computer 400 performs various processes in accordance with the programs stored in a ROM (Read Only Memory) 402 or with the programs loaded from a storage portion 413 into a RAM (Random Access Memory) 403. The RAM 403 may also accommodate data that may be needed by the CPU 401 in carrying out diverse processing.

The CPU 401, ROM 402, and RAM 403 are interconnected via a bus 404. An input/output interface 410 is also connected to the bus 404.

The input/output interface 410 is connected with an input portion 411 made up of a keyboard, a mouse, etc.; a display device formed by a CRT (Cathode Ray Tube), an LCD (Liquid Crystal Display) or the like; an output portion 412 composed of speakers or the like; a storage portion 413 constituted by a hard disk or the like; and a communication portion 414 made of a modem or the like. The communication portion 414 carries out communication processes over networks including the Internet.

A drive 415 is also connected as needed to the input/output interface 410. A piece of removable media 421 such as magnetic disks, optical disks, magneto-optical disks, and semiconductor memories may be attached to the drive 415. Computer programs retrieved from the attached removable medium may be installed as needed into the storage portion 413.

Where the above-described series of processes are to be carried out by software, the programs constituting the software may be installed from networks or from recording media.

As shown in FIG. 24, the recording media that hold these programs may be distributed to users not only as the removable media 421 apart from their apparatuses and constituted by magnetic disks (including flexible disks), optical disks (including CD-ROM (Compact Disc-Read Only Memory) and DVD (Digital Versatile Disc)), magneto-optical disks (including MD (Mini Disc)), or semiconductor memories, the media carrying the programs offered to the users; but also in the form of the ROM 402 or the hard disk in the storage portion 413, the media carrying the programs and incorporated beforehand in the users' apparatuses for program distribution.

Also, the programs for execution by the computer may be processed in the depicted sequence of this description (i.e., on a time series basis), in parallel, or in otherwise appropriately timed fashion such as when they are invoked.

In this description, the steps that describe the programs stored on the recording media may not represent solely the processes that are to be carried out in the depicted sequence, on a time series basis, but the steps may also represent processes that are conducted parallelly or individually.

In this description, the term "system" refers to an entire configuration made up of a plurality of component devices (apparatuses).

Any structure explained in the foregoing paragraphs as one device (or processing portion) may be divided into a plurality of devices (or processing portions). Conversely, the structures explained above as a plurality of devices (or processing portions) may be unified into one device (or processing portion). Also, each device (or processing portion) may obviously be supplemented with a structure or structures other than those discussed above. Furthermore, part of the structure of a device (or processing portion) may be included in the structure of another device (or processing portion), provided the structures and the workings remain substantially the same for the system as a whole. Thus it should be understood that the present invention when embodied is not limited to the above-described embodiments and that various modifications, variations and alternatives may be made of the invention so far as they are within the scope of the appended claims or the equivalents thereof.

EXPLANATION OF REFERENCE

100 Image encoding apparatus
101 Image line input portion
102 Line buffer portion
103 Wavelet transform portion
104 Coefficient line sorting portion
105 Quantization portion
106 Entropy encoding portion
107 Addition portion
108 Encoded line sorting portion
109 Rate control portion
111 Coefficient line sorting buffer
112 Coefficient line readout portion
121 Encoded line sorting buffer
122 Encoded line readout portion
200 Image decoding apparatus
201 Code word interpretation portion
202 Line extraction portion
203 Entropy decoding portion
204 Inverse quantization portion
205 Coefficient line sorting portion
206 Wavelet inverse transform portion
207 Buffer portion
211 Coefficient line sorting buffer
212 Coefficient line readout portion

The invention claimed is:
1. An image processing apparatus comprising:
analysis filter means for performing analysis filter processing hierarchically so as to transform a line block including image data of as many lines as are needed to generate coefficient data of at least one line of the lowest frequency component subband, into coefficient data divided into different frequency bands;
encoding means for encoding said coefficient data generated by said analysis filter means; and encoded data sorting means for sorting the encoded data obtained by said encoding means encoding said coefficient data, from the order in which the data is output from said analysis filter means performing said analysis filter processing, into a transmission order which is a predetermined order different from the order of the data being subjected to synthesis filter processing and in which the data is transmitted with improved resistance to the instability of transmission paths.

2. The image processing apparatus according to claim 1, wherein said encoded data sorting means sorts said encoded data on different divided levels into said transmission order starting from a low-frequency component and going to a high-frequency component.

3. The image processing apparatus according to claim 1, further comprising:

coefficient data sorting means for sorting said coefficient data generated by said analysis filter means from the order in which the data is output from said analysis filter means performing said analysis filter processing, into an encoding order which is a predetermined order different from the order of the data being subjected to said synthesis filter processing as well as from said transmission order and which permits easier rate control of said encoded data;

quantization means for quantizing said coefficient data sorted by said coefficient data sorting means; and rate control means for controlling the rate of said encoded data by controlling a quantization step size of quantization by said quantization means based on a result of encoding by said encoding means;

wherein said encoding means encodes said coefficient data quantized by said quantization means.

4. The image processing apparatus according to claim 3, wherein said coefficient data sorting means sorts said coefficient data on different divided levels into said transmission order starting from a low-frequency component and going to a high-frequency component.

5. The image processing apparatus according to claim 1, wherein said analysis filter means performs said analysis filter processing using lifting calculation.

6. The image processing apparatus according to claim 5, wherein said analysis filter means performs symmetric expansion of necessary pixels on the line block in an initial state before carrying out said lifting calculation on said line block, said analysis filter means further performing said lifting calculation on the line block in a steady state by use of a result of the preceding lifting calculation.

7. The image processing apparatus according to claim 5, wherein said analysis filter means performs said lifting calculation horizontally on said coefficient data before carrying out said lifting calculation vertically thereon.

8. An image processing method for use with an image processing apparatus, said image processing method comprising:

causing analysis filter means of said image processing apparatus to perform analysis filter processing hierarchically so as to transform a line block including image data of as many lines as are needed to generate coefficient data of at least one line of the lowest frequency component subband, into coefficient data divided into different frequency bands;

causing encoding means of said image processing apparatus to encode said coefficient data generated by said analysis filter processing and causing encoded data sorting means of said image processing apparatus to sort the encoded data obtained by encoding said coefficient data, from the order in which the data is output from said analysis filter processing, into a transmission order which is a predetermined order different from the order of the data being subjected to synthesis filter processing and in which the data is transmitted with improved resistance to the instability of transmission paths.

9. An image processing apparatus comprising:

decoding means for decoding encoded data generated by encoding a line block derived from the division of image data of a predetermined number of lines by hierarchical analysis filter processing into different frequency bands, said line block including at least one line of coefficient data of the lowest frequency component subband, said line block being further made up of a group of coefficient data of different subbands;

coefficient data sorting means for sorting said coefficient data obtained through decoding by said decoding means from the order in which the data is decoded by said decoding means into an order in which the data is subjected to synthesis filter processing; and synthesis filter means for performing said synthesis filter processing hierarchically so as to transform into said image data said coefficient data of the different subbands sorted by said coefficient data sorting means.

10. The image processing apparatus according to claim 9, wherein said synthesis filter means performs said synthesis filter processing preferentially on the coefficient data of the subband on the lowest practicable level.

11. The image processing apparatus according to claim 9, further comprising:

interpretation means for interpreting said encoded data; and extraction means for extracting, based on a result of interpretation by said interpretation means, said encoded data through division thereof into encoded data corresponding to each line of said encoded data on each of different hierarchical levels;

wherein said decoding means decodes said encoded data extracted by said extraction means.

12. The image processing apparatus according to claim 11, wherein, based on a result of interpretation by said interpretation means, said coefficient data sorting means determines the order in which said coefficient data is sorted and changes the determined sorting order to an order in which said coefficient data is subjected to synthesis filter processing.

13. The image processing apparatus according to claim 9, wherein said synthesis filter means performs said synthesis filter processing using lifting calculation.

14. The image processing apparatus according to claim 13, wherein said synthesis filter means performs symmetric expansion of necessary coefficient data on the line block in an initial state before carrying out said lifting calculation on said line block, said synthesis filter means further performing said lifting calculation on the line block in a steady state by use of a result of the preceding lifting calculation.

15. The image processing apparatus according to claim 13, wherein said synthesis filter means performs said lifting calculation horizontally on said coefficient data before carrying out said lifting calculation vertically thereon.

16. An image processing method for use with an image processing apparatus, said image processing method comprising:

causing decoding means of said image processing apparatus to decode encoded data generated by encoding a line block derived from the division of image data of a predetermined number of lines by hierarchical analysis filter processing into different frequency bands, said line block including at least one line of coefficient data of the lowest frequency component subband, said line block being further made up of a group of coefficient data of different subbands;

causing coefficient data sorting means of said image processing apparatus to sort said coefficient data obtained through decoding from the order in which the data is decoded into an order in which the data is subjected to synthesis filter processing; and causing synthesis filter means of said image processing apparatus to perform said synthesis filter processing hierarchically so as to transform into said image data said coefficient data of the different subbands having been sorted.

* * * * *